United States Patent
Tsukui et al.

(10) Patent No.: US 9,385,400 B2
(45) Date of Patent: Jul. 5, 2016

(54) METHOD FOR MANUFACTURING SEALED BATTERY

(71) Applicant: TOYOTA JIDOSHA KABUSHIKI KAISHA, Toyota-shi, Aichi (JP)

(72) Inventors: Akira Tsukui, Toyota (JP); Hiroyasu Kado, Seto (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/411,157

(22) PCT Filed: Jun. 28, 2013

(86) PCT No.: PCT/JP2013/067851
§ 371 (c)(1),
(2) Date: Mar. 30, 2015

(87) PCT Pub. No.: WO2014/003175
PCT Pub. Date: Jan. 3, 2014

(65) Prior Publication Data
US 2015/0255832 A1    Sep. 10, 2015

(30) Foreign Application Priority Data
Jun. 29, 2012 (JP) .................. 2012-147894

(51) Int. Cl.
*H01M 10/052* (2010.01)
*H01M 10/42* (2006.01)
*H01M 10/04* (2006.01)
*G01M 3/22* (2006.01)
*H01M 10/30* (2006.01)
*H01M 10/34* (2006.01)

(52) U.S. Cl.
CPC .......... *H01M 10/4228* (2013.01); *G01M 3/226* (2013.01); *H01M 10/04* (2013.01); *H01M 10/052* (2013.01); *H01M 10/30* (2013.01); *H01M 10/345* (2013.01); *Y10T 29/4911* (2015.01)

(58) Field of Classification Search
None
See application file for complete search history.

(56) References Cited

U.S. PATENT DOCUMENTS 6,593,026 B1    7/2003    Tukawaki et al.

FOREIGN PATENT DOCUMENTS

| CN | 1350336 A | 5/2002 |
|---|---|---|
| JP | 5-21089 A | 1/1993 |
| JP | 2002-134164 A | 5/2002 |
| JP | 2006-202560 A | 8/2006 |
| JP | 2009-26569 A | 2/2009 |

OTHER PUBLICATIONS

International Search Report of PCT/JP2013/067851, dated Aug. 13, 2013. [PCT/ISA/210].

*Primary Examiner* — Tracy Dove
(74) *Attorney, Agent, or Firm* — Sughrue Mion, PLLC

(57) ABSTRACT

Disclosed is a method for manufacturing a sealed battery capable of reducing leakage of helium gas introduced into an exterior. A method for manufacturing a sealed battery according to the present invention includes a leak testing step for detecting leak of helium gas (H) introduced into an exterior (30), a processing step for increasing apparent specific gravity of the helium gas (H) by mixing the helium gas (H) and the hydrocarbon gas with specific gravity larger than that of the helium gas (H) to prepare mixed gas (G), an introducing step for introducing the helium gas (H) into the exterior (30) with the apparent specific gravity of the helium gas (H) increased by introducing the mixed gas (G), and a sealing step for sealing the exterior (30) into which the helium gas (H) is introduced.

7 Claims, 23 Drawing Sheets

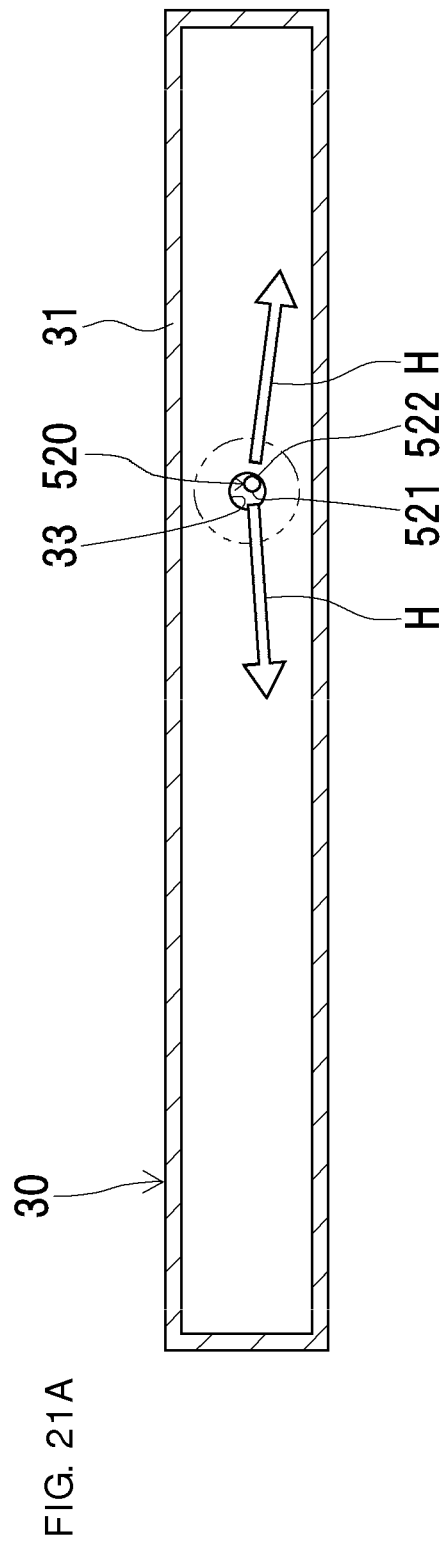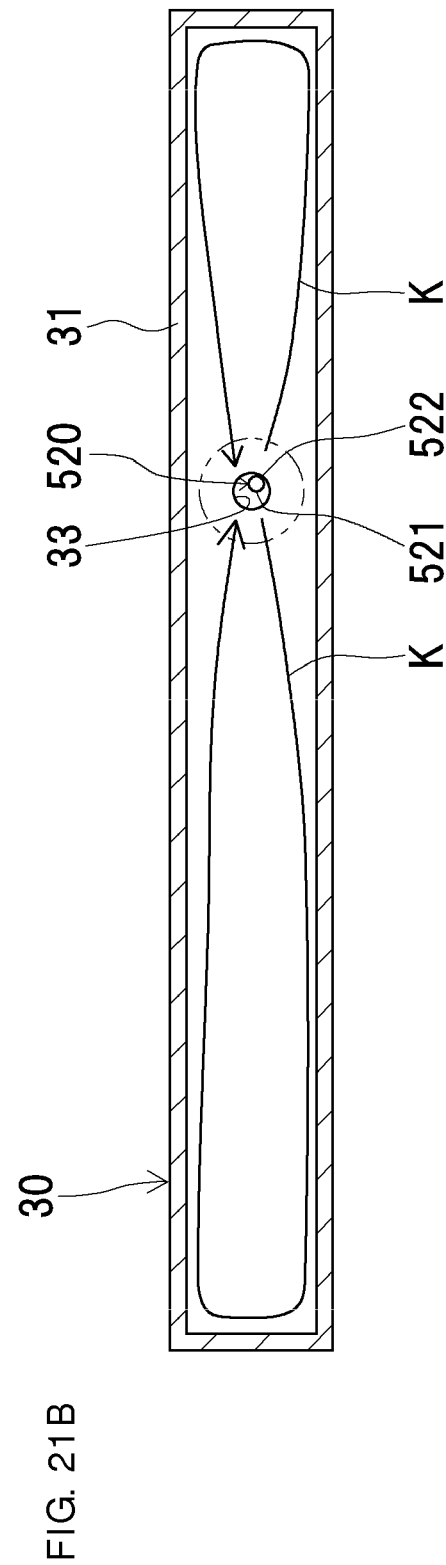

METHOD FOR MANUFACTURING SEALED BATTERY

CROSS REFERENCE TO RELATED APPLICATIONS

This application is a National Stage of International Application No. PCT/JP2013/067851 filed Jun. 28, 2013, claiming priority based on Japanese Patent Application No. 2012-147894, filed Jun. 29, 2012, the contents of all of which are incorporated herein by reference in their entirety.

TECHNICAL FIELD

The present invention relates to a method for manufacturing a sealed battery, including a leak testing step for detecting leak of detection gas introduced into a battery case.

BACKGROUND ART

Conventionally, a step for manufacturing a sealed battery includes a leak testing step for checking airtightness of a battery case for the purpose of, for example, preventing battery performance from deteriorating due to infiltration of water into the battery case (see Patent Literature 1, for example).

A sealed battery used for an airtightness inspecting method disclosed in Patent Literature 1 is manufactured in an airtight chamber having an atmosphere of detection gas, and thereby the detection gas is introduced into a battery case. After the detection gas is introduced into the battery case, the battery case is sealed. The airtightness inspecting method disclosed in Patent Literature 1 includes producing a vacuum in the airtight chamber after removing the detection gas from the airtight chamber, detecting the detection gas leaked from the sealed battery by a gas sensor arranged in the vicinity of a vent of the airtight chamber.

In the above-mentioned the airtightness inspecting method disclosed in Patent Literature 1, since the sealed battery is manufactured under the atmosphere of the detection gas, equipment for manufacturing the battery needs to be sealed by a large airtight chamber. Moreover, a large amount of detection gas is required in order to produce the atmosphere of the detection gas in the airtight chamber.

There is the following method: under an air atmosphere, detection gas is jetted to be introduced into a battery case through a nozzle from the outside of the battery case before sealed, and then the battery case is conveyed to predetermined equipment for sealing the battery case.

However, if helium gas as the detection gas is introduced into the battery case for the purpose of, for example, preventing battery performance from being adversely affected, most of the helium gas with small specific gravity is leaked until sealing the battery case.

Therefore, in this case, rate of utilization of the detection gas (proportion of the amount of the stored detection gas to the amount of the jetted detection gas) is reduced.

Moreover, in this case, time from introduction of the helium gas until seal of the battery case varies, and thereby leakage of the helium gas varies. In other words, in this case, density of the helium gas in the battery case varies.

As shown in FIG. 23, if a predetermined amount of leak gas is leaked from the battery case, an output value of a gas sensor varies according to the density of the helium gas in the battery case. Concretely, the output value becomes large when the density of the helium gas in the leak gas is high (see graph G11 in FIG. 23), and becomes small when the density of the helium gas in the leak gas is low (see graph G12 in FIG. 23).

In a leak testing step, a threshold M1 needs to be set on the basis of the output value of the gas sensor when the density of the helium gas is low.

Accordingly, when the leak testing step is performed with respect to the battery case accommodating the helium gas with high density, the output value of the gas sensor may exceed the threshold M1 in spite of leakage of the leak gas smaller than leakage N of the leak gas corresponding to the threshold M1 when the density of the helium gas is low (see range R1 in FIG. 23).

Thus, if the detection gas is introduced under an air atmosphere, an amount of the helium gas present in the leak gas leaked from the battery case during the inspection varies, and thereby a sealed battery which normally passes the inspection fails the inspection with relatively high probability. In other words, if the detection gas is introduced under an air atmosphere, rate of erroneous determination may increase.

As mentioned above, since a conventional technique cannot minimize the leakage of the detection gas after the introduction of the detection gas into the battery case, the rate of the utilization of the detection gas may decreases and rate of erroneous determination in the inspection may increase.

CITATION LIST

Patent Literature

Patent Literature 1: JP 2009-26569 A

SUMMARY OF INVENTION

Problem to be Solved by the Invention

The present invention is made in view of the situation as mentioned above. The objective of the present invention is to provide a method for manufacturing a sealed battery capable of reducing leakage of detection gas introduced into a battery case.

Means for Solving the Problem

A first aspect of the invention is a method for manufacturing a sealed battery having a battery case, including a leak testing step for detecting leak of detection gas introduced into the battery case, a processing step for increasing apparent specific gravity of the detection gas, an introducing step for introducing the detection gas into the battery case after increasing the apparent specific gravity of the detection gas, and a sealing step for sealing the battery case into which the detection gas is introduced.

Preferably, in the processing step, mixed gas is prepared by mixing the detection gas and gas with specific gravity larger than that of the detection gas, and in the introducing step, the prepared mixed gas is introduced.

Preferably, in the processing step, at least one of a temperature inside the battery case and a temperature of the detection gas is adjusted so that the temperature of the detection gas is lower than the temperature inside the battery case.

Preferably, an average of specific gravity of the mixed gas is larger than an average of specific gravity of a gaseous body inside the battery case.

A second aspect of the invention is a method for manufacturing a sealed battery having a battery case, including a leak testing step for detecting leak of detection gas introduced into the battery case, an introducing step for introducing the detection gas into the battery case, and a sealing step for sealing the battery case into which the detection gas is introduced. In the introducing step, a jetting port of a nozzle capable of jetting the detection gas is arranged inside the battery case, and the detection gas is jetted from the jetting port facing the farthest side of the battery case.

Preferably, in the introducing step, along a direction parallel to one face, having an opening through which the jetting port of the nozzle is arranged inside the battery case, of the battery case, the detection gas is jetted toward the farthest side of the battery case, and the opposite side of the farthest side of the battery case.

Preferably, the sealing step is performed immediately after the introducing step.

Effects of the Invention

The present invention exerts the following effect: leakage of detection gas introduced into a battery case can be reduced.

BRIEF DESCRIPTION OF DRAWINGS

FIG. 4 shows a process from supplying the detection gas until sealing a pouring hole.

FIG. 8 shows results of experiments in manufacturing methods according first to third embodiments.

FIG. 10 shows positions in which nozzles according to first to third comparative examples are arranged.

FIG. 11 shows results of experiments in which the curved nozzle is used, and which the nozzles according to the first to third comparative examples are used.

FIG. 13 shows a result of experiment in a manufacturing method according the fourth embodiment.

FIG. 14 shows a nozzle according to a fifth embodiment.

FIG. 17 shows a nozzle according to a first modified example.

FIG. 19 shows a nozzle according to a second modified example.

FIG. 20 shows a relationship between positions of the nozzle according to the second modified example and the pouring hole.

FIG. 21 is a plan view showing how the nozzle according to the second modified example jets the helium gas out. FIG. 21A shows directions in which the helium gas is jetted. FIG. 21B shows a current of air generated by jets of the helium gas.

FIG. 22 shows how a gaseous body inside the exterior is discharged.

DESCRIPTION OF EMBODIMENTS

Described below is a method for manufacturing a sealed battery according to the present embodiment (hereinafter, referred to simply as a "manufacturing method").

Figure 1:
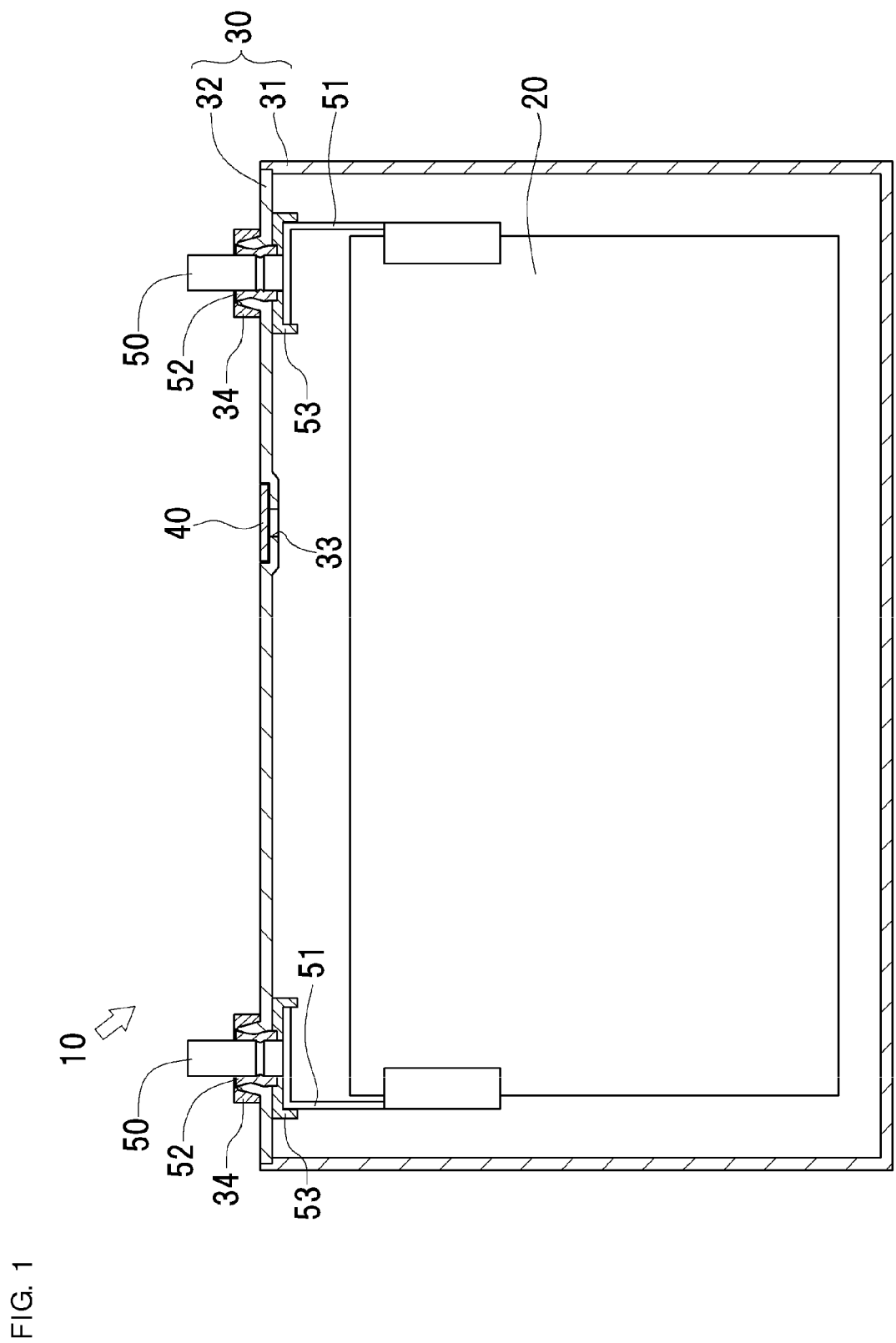
FIG. 1 shows an overall structure of a battery.

First, with reference to FIG. 1, described is a general structure of a battery 10 as a first embodiment of a sealed battery according to the present invention.

The battery 10 in the present embodiment is a sealed-type lithium-ion secondary battery. An object to which the present invention is applied is not limited to a lithium-ion secondary battery, and the present invention may be applied to another sealed battery such as nickel-hydrogen secondary battery.

The battery 10 includes a power-generation element 20, an exterior 30, a cap 40 and two external terminals 50.

The power-generation element 20 is made by impregnating an electrolyte solution into an electrode body formed by laminating or winding a positive electrode, a negative electrode and separators. A chemical reaction occurs in the power-generation element 20 when the battery 10 is charged and discharged (specifically, ions moves through the electrolyte solution between the positive and negative electrodes), which generates an electric current.

The exterior 30 as a battery case is a container formed in a prism, and has a storage part 31 and a lid part 32.

The storage part 31 is a member formed in a bottomed rectangular tube, whose one face is open. The storage part 31 accommodates the power-generation element 20.

The lid part 32 is a plate-shaped member having a shape corresponding to the open surface of the storage part 31. The lid part 32 is joined to the storage part 31 while covering the open surface of the storage part 31. As mentioned later, in the lid part 32, a pouring hole 33 through which the electrolyte solution is poured is formed between portions into which the external terminals 50 are inserted.

The pouring hole 33 is a through hole formed in substantially a circle in plan view. The pouring hole 33 has a portion situated in the outer portion of the lid part 32, and a portion situated in the inner portion of the lid part 32, and these portions of the pouring hole 33 are different from each other in inner diameter. In the pouring hole 33, the inner diameter of the upper portion (outer portion) is larger than that of the lower portion (inner portion).

The battery in the present embodiment is configured as a prismatic battery whose exterior is formed in a bottomed rectangular tube, but a sealed battery according to the present invention is not limited thereto. For example, the sealed battery according to the present invention may be applied to a cylindrical battery whose exterior is formed in a bottomed cylinder.

The cap 40 is a member for sealing the pouring hole 33. The cap 40 is substantially similar in shape to the upper portion of the pouring hole 33. The cap 40 is placed on the lower portion of the pouring hole 33, and the periphery of the cap 40 is welded by laser beam, whereby the cap 40 is joined to the lid part 32.

The external terminals 50 are arranged so that parts thereof protrude upwardly (outwardly) of the battery 10 from the outer surface of the lid part 32. The external terminals 50 are electrically connected to the positive and negative electrodes of the power-generation element 20 through two collecting terminals 51. A fixing member 34 is fit on the outer circumferential surface of each external terminal 50, and thereby each external terminal 50 is fixed and insulated against the lid part 32 by insulators 52 and 53 interposed therebetween. The external terminals 50 and the collecting terminals 51 act as paths through which electricity stored in the power-generation element 20 is supplied to the outside and electricity from the outside is supplied to the power-generation element 20.

The collecting terminals 51 are connected to the positive and negative electrodes of the power-generation element 20. Aluminum may be used as a material of the positive-side collecting terminals 51, and copper may be used as a material of the negative-side collecting terminals 51, for example.

The external terminals 50 has bolt portions formed by performing thread rolling with respect to portions thereof protruding outwardly of the battery 10. When the battery 10 is actually used, bus bars, connecting terminals of an external device and the like are fastened to the external terminals 50 through the bolt portions. When they are fastened, fastening torque is applied to the external terminals 50, and external force is applied to the external terminals 50 in the axial direction thereof by screw fastening. Therefore, a high-strength material such as iron is preferably used as a material of each external terminal 50.

Next, the manufacturing method according to the first embodiment is described.

In the manufacturing method, mixtures (a positive-electrode mixture and a negative-electrode mixture) are applied to the surfaces of current collectors (a positive-electrode collector and a negative-electrode collector) by a coater such as a die coater, and after that, the mixtures are dried.

Then, the mixtures on the surfaces of the current collectors are pressed, and thereby mixture layers (a positive-electrode mixture layer and a negative-electrode mixture layer) are formed on the surfaces of the current collectors.

In the manufacturing method, the electrode body is formed by laminating or winding the positive and negative electrodes made by passing through the above mentioned steps, and the separators. Then, the external terminals 50, the collecting terminals 51 and the like integrated with the lid part 32 of the exterior 30 are connected to the electrode body, and the electrode body is stored in the storage part 31 of the exterior 30. After that, the storage part 31 and the lid part 32 of the exterior 30 are welded to each other to seal the exterior 30.

Figure 2:
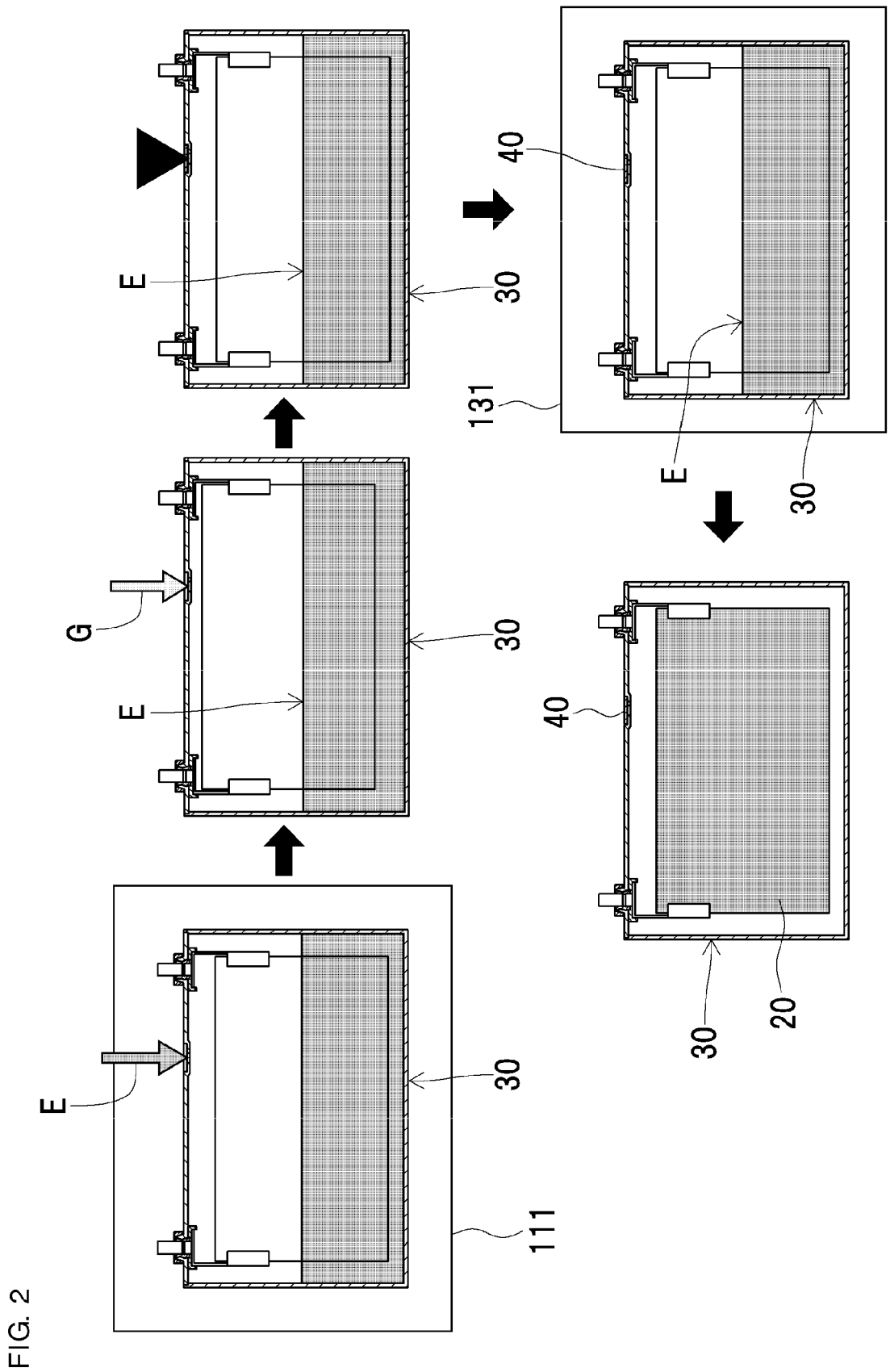
FIG. 2 shows a step for manufacturing the battery according to a first embodiment of the present invention.

After sealing the exterior 30, as shown in FIG. 2, an electrolyte solution E is poured through the pouring hole 33 (see arrow E in FIG. 2).

At this time, for example, the exterior 30 is housed in a chamber 111, and a predetermined pouring unit is attached to the exterior 30. Then a vacuum in the chamber 111 is produced. After that, air is introduced into the chamber 111 to return the pressure in the chamber 111 to the atmospheric pressure. The electrolyte solution E is poured into the exterior 30 by utilizing the differential pressure at this time.

After pouring the electrolyte solution E, mixed gas G is introduced into the exterior 30 (see arrow G in FIG. 2).

Figure 3:
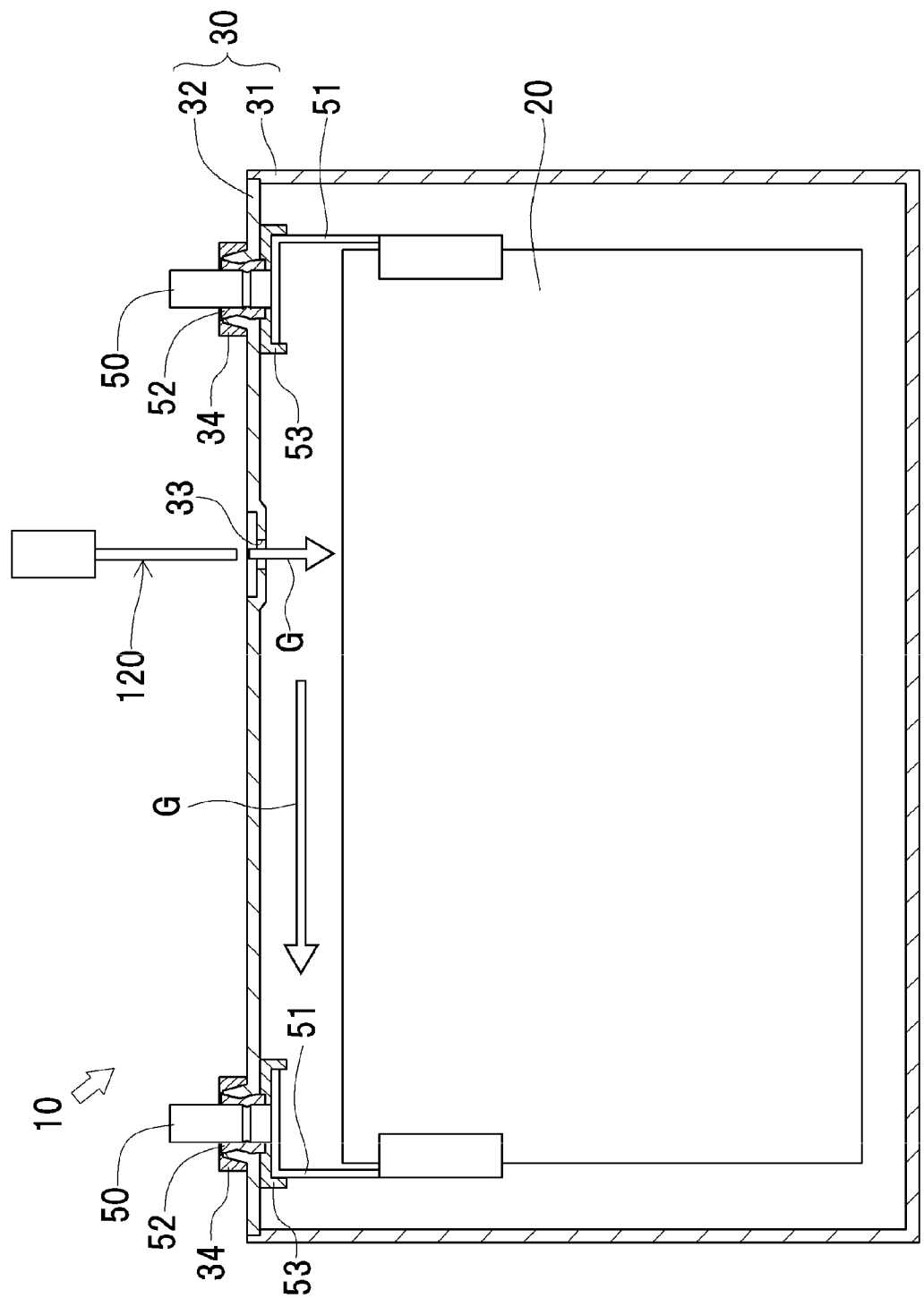
FIG. 3 shows how detection gas is introduced.
Figure 4A:
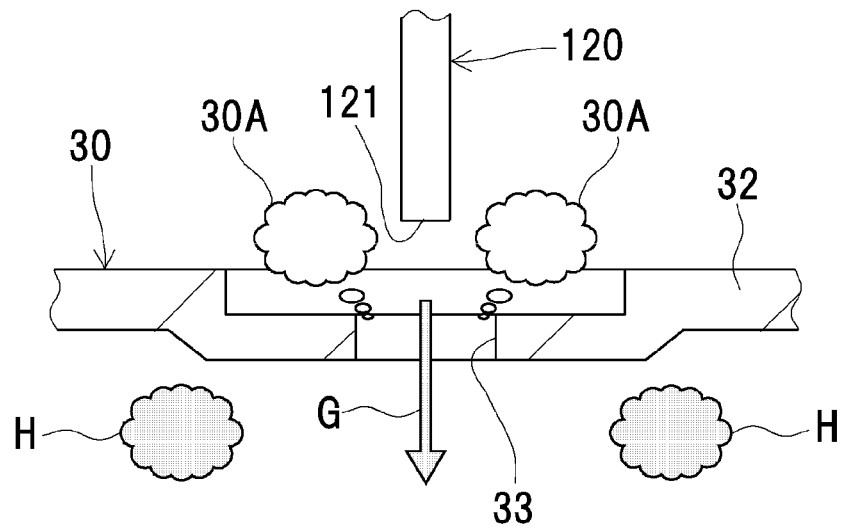
FIG. 4A shows how the detection gas is supplied.

At this time, as shown in FIGS. 3 and 4(a), a nozzle 120 having a jetting port 121 formed in the lower end thereof is arranged above the pouring hole 33, and the mixed gas G is jetted toward the pouring hole 33, thereby helium gas H as detection gas introduced into the exterior 30.

The mixed gas G introduced at this time is gas made by mixing the helium gas H and hydrocarbon gas which is a volatilized component of the electrolyte solution E.

The specific gravity of the hydrocarbon gas is larger than that of the helium gas H. Moreover, the exterior 30 is filled with air, the hydrocarbon gas and the like.

Therefore, if only the helium gas H is introduced into the exterior 30, it is difficult for the helium gas H to enter the inside of the exterior 30 due to small specific gravity of the exterior 30. In other words, if only the helium gas H is introduced, the helium gas H partly leaks through the pouring hole 33 during the introduction.

In the manufacturing method according to the first embodiment, as mentioned previously, the mixed gas G made by mixing the helium gas H and the hydrocarbon gas is introduced into the exterior 30.

In other words, in the manufacturing method according to the first embodiment, the helium gas H is mixed with the hydrocarbon gas, and thereby the average of the specific gravity of the mixed gas G becomes large compared with the case of ordinarily introducing the helium gas H.

Thus, in the manufacturing method according to the first embodiment, apparent specific gravity of the helium gas H, namely, relative specific gravity of the helium gas H (the average of the specific gravity of the mixed gas G) with respect to an average of specific gravity of air and gas in the exterior 30 becomes large.

In this manner, the manufacturing method according to the first embodiment allows the helium gas H to sink in the exterior 30 during the introduction of the helium gas. Therefore, the manufacturing method according to the first embodiment makes it possible to effectively introduce the helium gas H (see air and gas 30A in the exterior 30 in FIG. 4(a)).

In other words, the manufacturing method according to the first embodiment makes it possible to reduced leakage of the helium gas during the introduction of the helium. Moreover, the manufacturing method according to the first embodiment makes it possible to introduce the helium gas H with high density into the exterior 30.

After introducing the helium gas H into the exterior 30, as shown in FIG. 2, the pouring hole 33 is sealed with the cap 40 (see the black-painted triangle in FIG. 2).

Figure 4B:
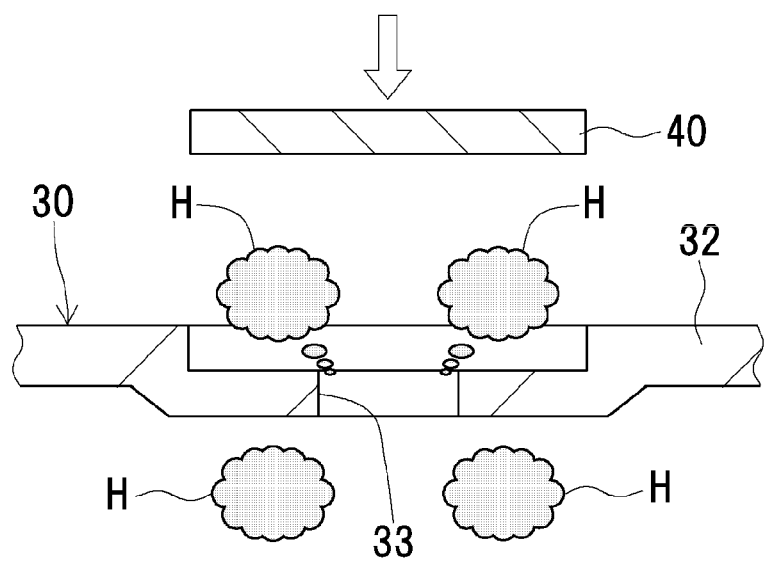
FIG. 4B shows how a cap is fit into the pouring hole.
Figure 4C:
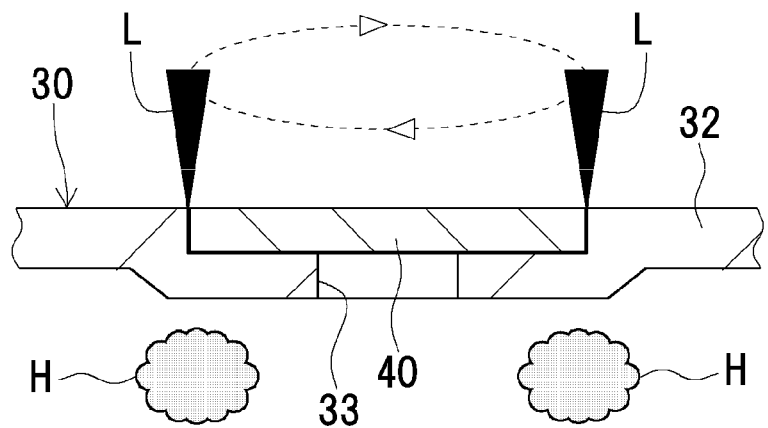
FIG. 4C shows how the cap is welded.

At this time, as shown in FIGS. 4(b) and 4(c), the pouring hole 33 is covered with the cap 40, and the periphery of the cap 40 is irradiated with laser beam L using a laser beam welding device to seal the pouring hole 33.

Thus, the manufacturing method includes a sealing step for sealing the exterior 30 into which the helium gas H is introduced.

After sealing the pouring hole 33, as shown in FIG. 2, leak from the exterior 30 (i.e., airtightness of the exterior 30) is checked.

At this time, the exterior 30 is housed in a predetermined chamber 131, and a vacuum in the chamber 131 is produced. Then, it is tested by a commercially available helium-leak testing device whether the helium gas H is leaked from the exterior 30 into the chamber 131 or not.

Figure 5:
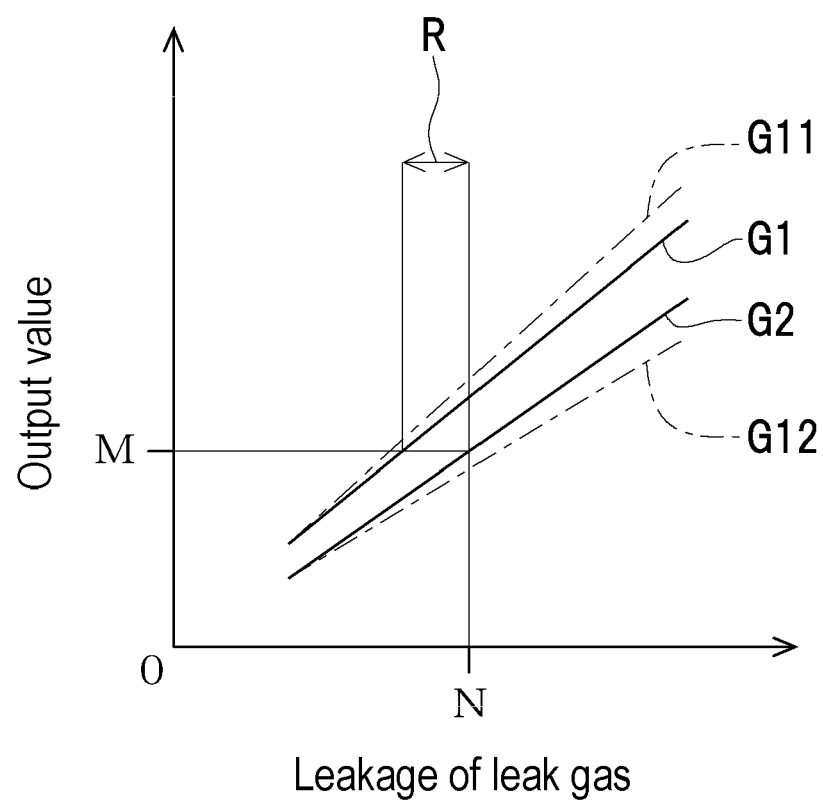
FIG. 5 shows a range within which erroneous determination occurs.

In other words, as shown in FIG. 5, an amount of the helium gas H present in leak gas leaked from the exterior 30 into the chamber 131 is measured by the helium-leak testing device. If an output value of the helium-leak testing device exceeds a predetermined threshold M, it is determined that the exterior 30 has a leak.

Thus, the manufacturing method includes a leak testing step for detecting leak of the helium gas H as the detection gas introduced into the exterior 30.

The detection gas is not limited to that in the present embodiment, but helium gas is preferably used thereas. This is because, compared with other detection gas, a use of helium gas brings the following various effects: adverse effect on battery performance can be prevented, and leak through a minute hole owing to small molecular diameter.

If only the helium gas H is introduced, the helium gas H does not sink in the exterior 30 due to small specific gravity of the helium gas H. Consequently, most of the helium gas H is situated in the vicinity of the pouring hole 33. Therefore, most of the helium gas H is leaked through the pouring hole 33 between the introduction of the helium gas H and the seal of the pouring hole 33.

In the manufacturing method according to the first embodiment, the apparent specific gravity of the helium gas H is increased in order to sink the helium gas H in the exterior 30.

As shown in FIG. 4, this makes it possible to suppress the leak of the helium gas H through the pouring hole 33 between the introduction of the helium gas H and the seal of the pouring hole 33. In other words, the manufacturing method according to the first embodiment makes it possible to reduce the leakage of the helium gas after introducing the helium gas H into the exterior 30.

Thus, the manufacturing method includes a processing step for mixing the helium gas H and gas with specific gravity larger than that of the helium gas H to make the mixed gas G.

Moreover, the manufacturing method includes an introducing step for introducing the mixed gas G.

In this manner, the manufacturing method according to the first embodiment makes it possible to effectively utilize the helium gas H and consequently to improve rate of utilization of the helium gas (proportion of the amount of the stored helium gas to the amount of the jetted helium gas). In other words, the manufacturing method according to the first embodiment makes it possible to reduce cost required for the leak testing step.

The gas with specific gravity larger than that of the helium gas H is not limited to that in the present embodiment, but the hydrocarbon gas or the like is preferably used thereas in terms of the fact that the hydrocarbon gas or the like can prevent adverse effect on battery performance.

Moreover, the manufacturing method according to the first embodiment makes it possible to reduce the leakage of the helium gas during and after introducing the helium gas H into the exterior 30, and consequently to reduce variation of the density of the helium gas inside the exterior 30 in the leak testing step.

Therefore, as shown in FIG. 5, the manufacturing method according to the first embodiment makes it possible to reduce the difference, in the case where the leakage of the helium gas from the exterior 30 is a predetermined value, between an output value of the helium-leak testing device when the density of the helium gas is high (see graph G1 in FIG. 5) and an output value of the helium-leak testing device when the density of the helium gas is low (see graph G2 in FIG. 5).

In other words, the manufacturing method according to the first embodiment makes it possible to reduce variation of the output value of the helium-leak testing device depending on the density of the helium gas.

Thus, the manufacturing method according to the first embodiment makes it possible to minimize occurrence of the following situation: when the density of the helium gas is high, the output value exceeds the threshold M in spite of the leakage of the leak gas smaller than leakage N of the leak gas corresponding to the threshold M when the density of the helium gas is low (see range R in FIG. 5).

Therefore, the manufacturing method according to the first embodiment makes it possible to reduce rate of erroneous determination. In other words, the manufacturing method according to the first embodiment makes it possible to improve robustness of the leak testing step.

After checking leak in the exterior 30, as shown in FIG. 2, the battery 10 is conveyed to a predetermined place, and the electrolyte solution E is impregnated into the electrode body to make the power-generation element 20. Then, initial charging of the battery 10 is performed, and a check of voltage and the like is performed.

In the manufacturing method, the sealed-type battery 10 is manufactured in this manner.

In the manufacturing method, the helium gas may be introduced concurrently with the pouring of the electrolyte solution. In this case, after producing a vacuum in the chamber, the mixed gas is introduced into the chamber to return the pressure in the chamber to the atmospheric pressure.

In this manner, the manufacturing method makes it possible to introduce the helium gas into the exterior by simply connecting the chamber to a tank in which the mixed gas is stored. In other words, the manufacturing method makes it possible to introduce the helium gas without providing equipment for introducing the mixed gas.

Then, a method for manufacturing the battery 10 according to a second embodiment (hereinafter, referred to simply as a "manufacturing method") is described.

The manufacturing method according to the second embodiment is a step for manufacturing the same battery as the battery 10 according to the first embodiment (see FIG. 1).

Only a process for introducing the helium gas H into the exterior 30 is different between the manufacturing method according to the first embodiment and the manufacturing method according to the second embodiment. Therefore, hereinafter, the process for introducing the helium gas H into the exterior 30 is specifically described, and explanation for the other part is omitted.

Figure 6:
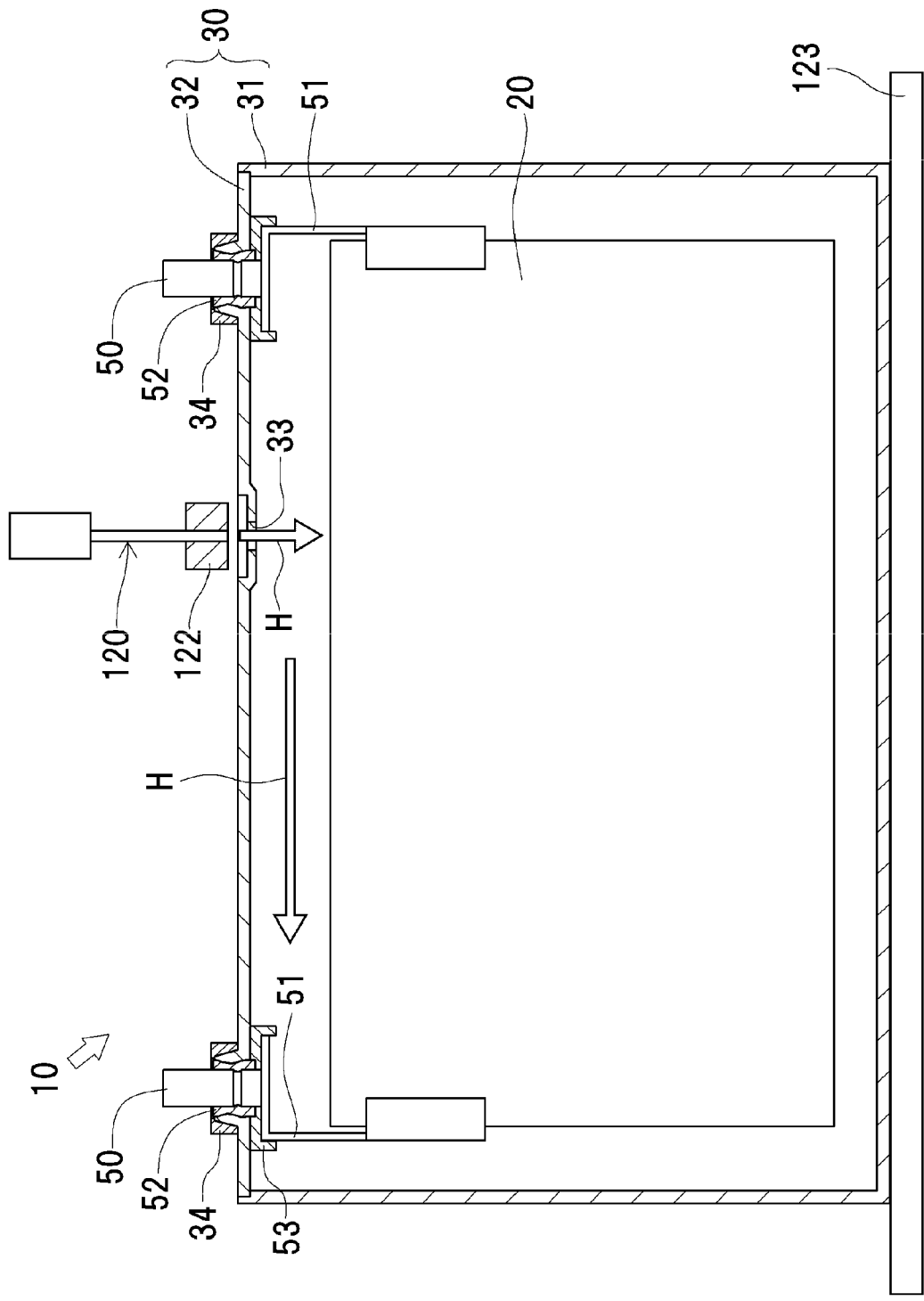
FIG. 6 shows how detection gas according to a second embodiment or a third embodiment is supplied.

As shown in FIG. 6, after pouring the electrolyte solution E, only the helium gas H as the detection gas is introduced into the exterior 30 (see arrows H in FIG. 6).

A cooling device 122 is, in the vicinity of the jetting port 121, externally fitted to the nozzle 120 for jetting the helium gas H. The cooling device 122 is run in introducing the helium gas to cool the helium gas H.

In the manufacturing method according to the second embodiment, the helium gas H is cooled, and thereby the density of the helium gas H becomes high compared with the case of ordinarily introducing the helium gas H.

Thus, in the manufacturing method according to the second embodiment, apparent specific gravity of the helium gas H, namely, relative specific gravity of the helium gas H with respect to an average of specific gravity of air and gas in the exterior 30 becomes large.

In this manner, the manufacturing method according to the second embodiment allows the helium gas H to sink in the exterior 30 during the introduction of the helium gas, thus enabling to reduce the leakage of the helium gas during and after introducing the helium gas H into the exterior 30.

Therefore, the manufacturing method according to the second embodiment makes it possible to improve rate of utilization of the helium gas, and consequently to reduce cost required for the leak testing step. Moreover, the manufacturing method according to the second embodiment makes it possible to introduce the helium gas H with high density into the exterior 30.

In addition, the manufacturing method according to the second embodiment makes it possible to reduce rate of erroneous determination, and to improve robustness of the leak testing step (see FIG. 5).

The cooling device is not limited to that according to the second embodiment as long as the cooling device can jet the cooled helium gas from the jetting port of the nozzle.

Then, a method for manufacturing the battery 10 according to a third embodiment (hereinafter, referred to simply as a "manufacturing method") is described.

The manufacturing method according to the third embodiment is a step for manufacturing the same battery as the battery 10 according to the first embodiment (see FIG. 1).

Only a process for introducing the helium gas H into the exterior 30 is different between the manufacturing method according to the first embodiment and the manufacturing method according to the third embodiment. Therefore, hereinafter, the process for introducing the helium gas H into the exterior 30 is specifically described, and explanation for the other part is omitted.

As shown in FIG. 6, after pouring the electrolyte solution E, only the helium gas H as the detection gas is introduced into the exterior 30 with the exterior 30 on a heating device 123 (see arrows H in FIG. 6). At this time, the heating device 123 is run to heat the exterior 30 to a predetermined temperature.

In the manufacturing method according to the third embodiment, the exterior 30 is heated, and thereby densities of air and gas in the exterior 30 become low compared with the case of ordinarily introducing the helium gas H.

Thus, in the manufacturing method according to the third embodiment, apparent specific gravity of the helium gas H, namely, relative specific gravity of the helium gas H with respect to an average of specific gravity of air and gas in the exterior 30 becomes large.

In this manner, the manufacturing method according to the third embodiment allows the helium gas H to sink in the exterior 30 during the introduction of the helium gas, thus enabling to reduce the leakage of the helium gas during and after introducing the helium gas H into the exterior 30.

Therefore, the manufacturing method according to the third embodiment makes it possible to improve rate of utilization of the helium gas, and consequently to reduce cost required for the leak testing step. Moreover, the manufacturing method according to the third embodiment makes it possible to introduce the helium gas H with high density into the exterior 30.

In addition, the manufacturing method according to the third embodiment makes it possible to reduce rate of erroneous determination, and to improve robustness of the leak testing step (see FIG. 5).

The heating device is not limited to that according to the third embodiment as long as the heating device can heat the inside of the exterior.

Moreover, in the manufacturing method, the exterior may be heated, and the vicinity of the jetting port of the nozzle may be cooled. In addition, the cooling device may be provided so as to cool the nozzle and the exterior, and the helium gas and the exterior may be cooled so that the helium gas is cooled more than the exterior.

Thus, in the processing step, at least one of the temperature inside the exterior 30 and the temperature of the helium gas H is adjusted so that the temperature of the helium gas H is lower than the temperature inside the exterior 30.

As mentioned above, the manufacturing method includes the processing step for increasing apparent specific gravity of the helium gas H.

Moreover, the manufacturing method includes the introducing step for introducing the helium gas H into the exterior 30 with the apparent specific gravity of the helium gas H increased.

In the present embodiment, the apparent specific gravity of the helium gas H means relative specific gravity of the helium gas H with respect to an average of specific gravity of air and gas in the exterior 30 (in the case of introducing the mixed gas G, the average of the specific gravity of the mixed gas G).

In the manufacturing method, for example, the mixed gas cooled by the cooling device may be introduced into the exterior heated by the heating device as long as the apparent specific gravity of the helium gas can be increased.

Described below is result of experiment on the density of the helium gas and the rate of the utilization of the helium gas for the case of introducing the helium gas H by the manufacturing methods according to the first to third embodiments.

In the experiment, a plurality of test pieces as objects to be compared were produced by introducing the helium gas H into the exterior 30 whose side faces were transparent in the state as shown in FIG. 3.

Figure 7:
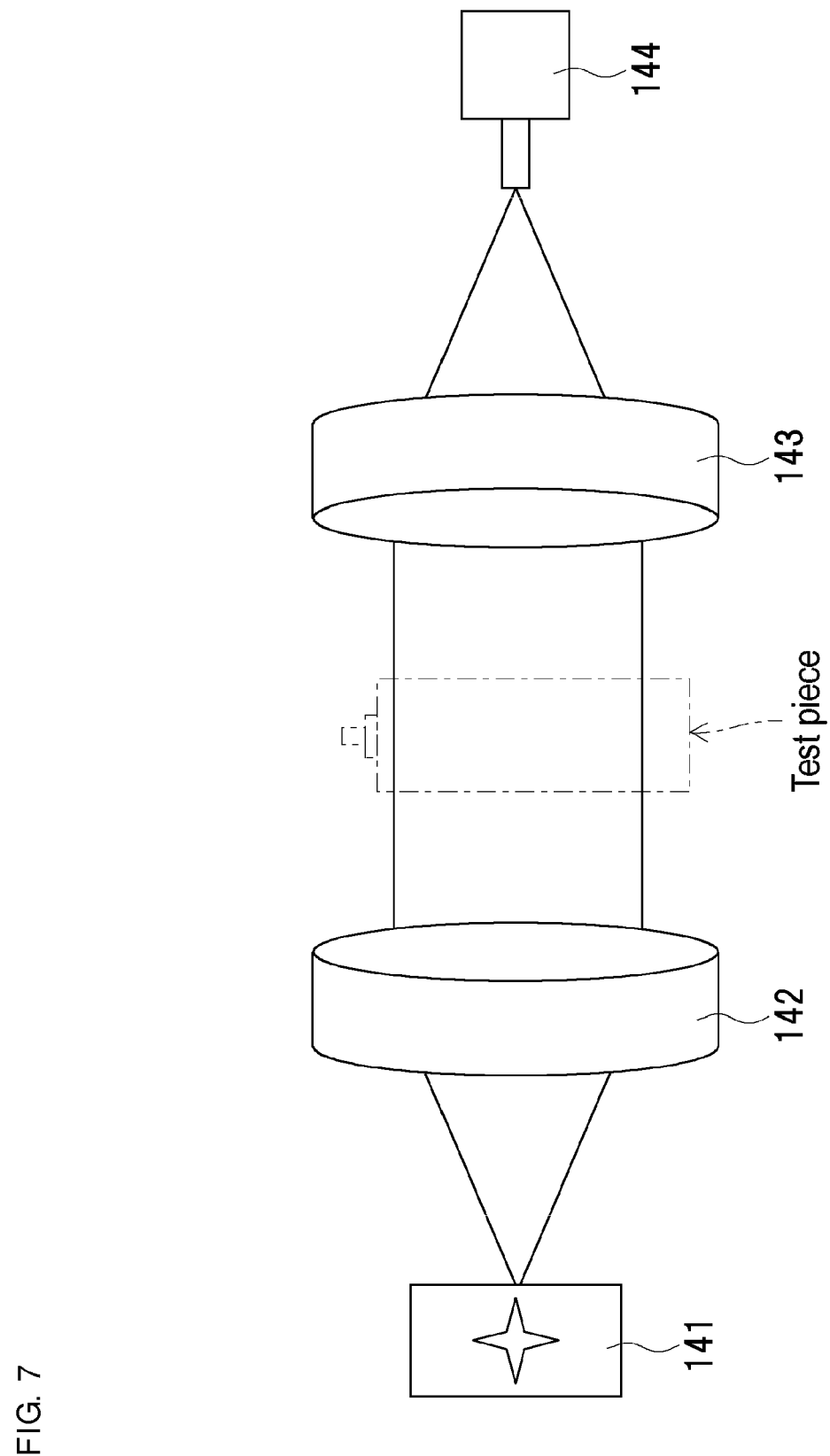
FIG. 7 shows a structure for visualizing gas introduced into an exterior.

As shown in FIG. 7, in the experiment, each test piece was arranged between achromatic lenses 142 and 143, and light was emitted from a light source 141 provided outside of the achromatic lens 142 to visualize variation of density inside the exterior 30. Moreover, in the experiment, a high-speed camera 144 was provided outside of the achromatic lens 143 to take photographs showing the variation of density inside the exterior 30.

In the experiment, a through hole was formed in the exterior 30 after introducing the helium, and a head of a helium-density measuring instrument was quickly pressed against the through hole to measure the density of the helium gas.

Moreover, in the experiment, the rate of the utilization of the helium gas was calculated based on the amount of the jetted helium gas, the measured density of the helium gas, and the like.

The result of the visualization in the objects to be compared confirmed that the helium gas H did not penetrate into the exterior 30 during the introduction of the helium gas.

Figure 8A:
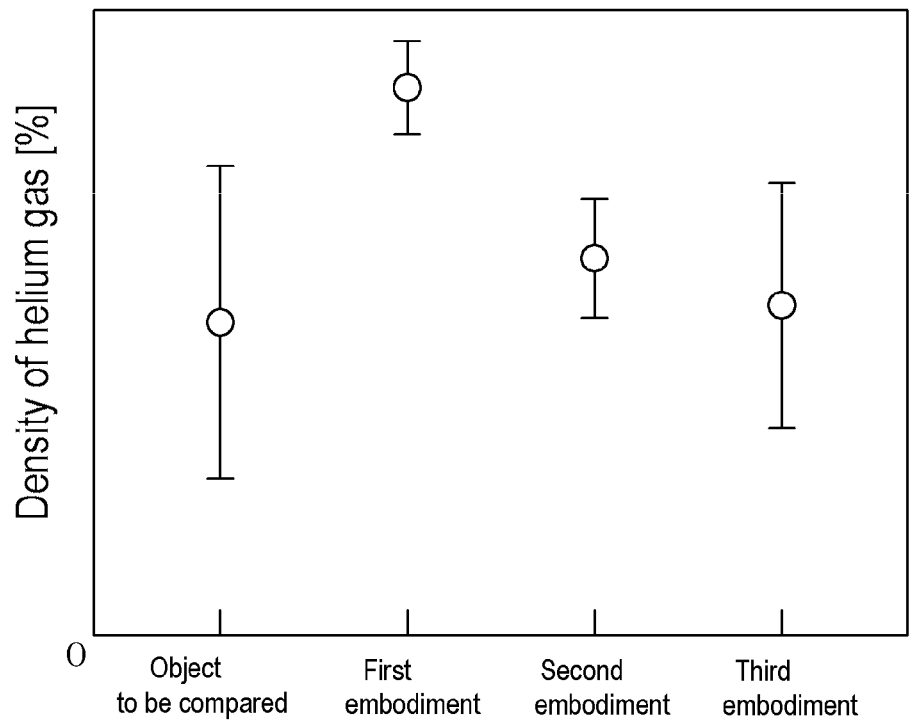
FIG. 8A shows results of measuring density of helium gas.
Figure 8B:
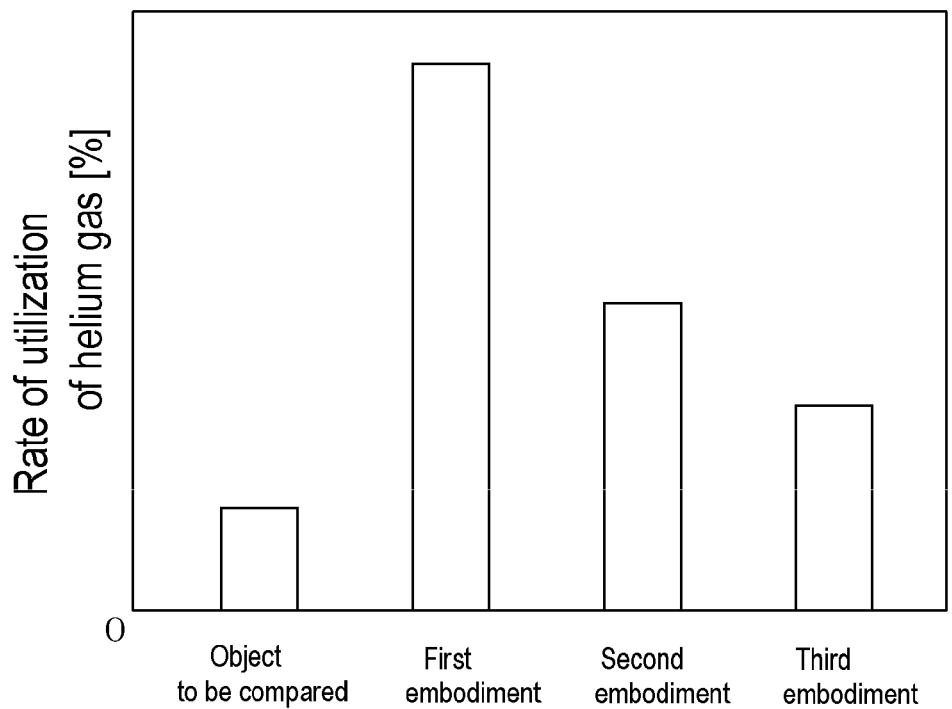
FIG. 8B shows results of calculating rate of utilization of the helium gas.

Moreover, FIG. 8 shows that, in the objects to be compared, the density of the helium gas is low and widely varies. In addition, FIG. 8 shows that, in the objects to be compared, most of the helium gas H leaks out, and the leakage of the helium gas varies.

Furthermore, FIG. 8 shows that, in the objects to be compared, the rate of the utilization of the helium gas is low.

The result of the visualization in the first to third embodiments confirmed that the helium gas H penetrated into the exterior 30 during the introduction of the helium gas.

Moreover, FIG. 8 shows that, in the first to third embodiments, the maximum and the variation of the density of the helium gas are improved, compared with the objects to be compared. In addition, FIG. 8 shows that, in the first to third embodiments, the leakage of the helium gas is reduced, and the variation of the leakage of the helium gas is minimized.

Furthermore, FIG. 8 shows that, in the first to third embodiments, the rate of the utilization of the helium gas is improved.

The result of the experiment mentioned above shows that the manufacturing methods according to the first to third embodiments make it possible to reduce the leakage of the helium gas during the introduction of the helium gas, and consequently to improve the variation of the density of the helium gas and the rate of the utilization of the helium gas. In addition, the result shows that the manufacturing methods according to the first to third embodiments make it possible to introduce the helium gas H with high density into the exterior 30.

Described below is result of experiment on the density of the helium gas and the rate of the utilization of the helium gas for the case of changing the shape, the position and the like of the nozzle for jetting the mixed gas G or the helium gas H.

Figure 9:
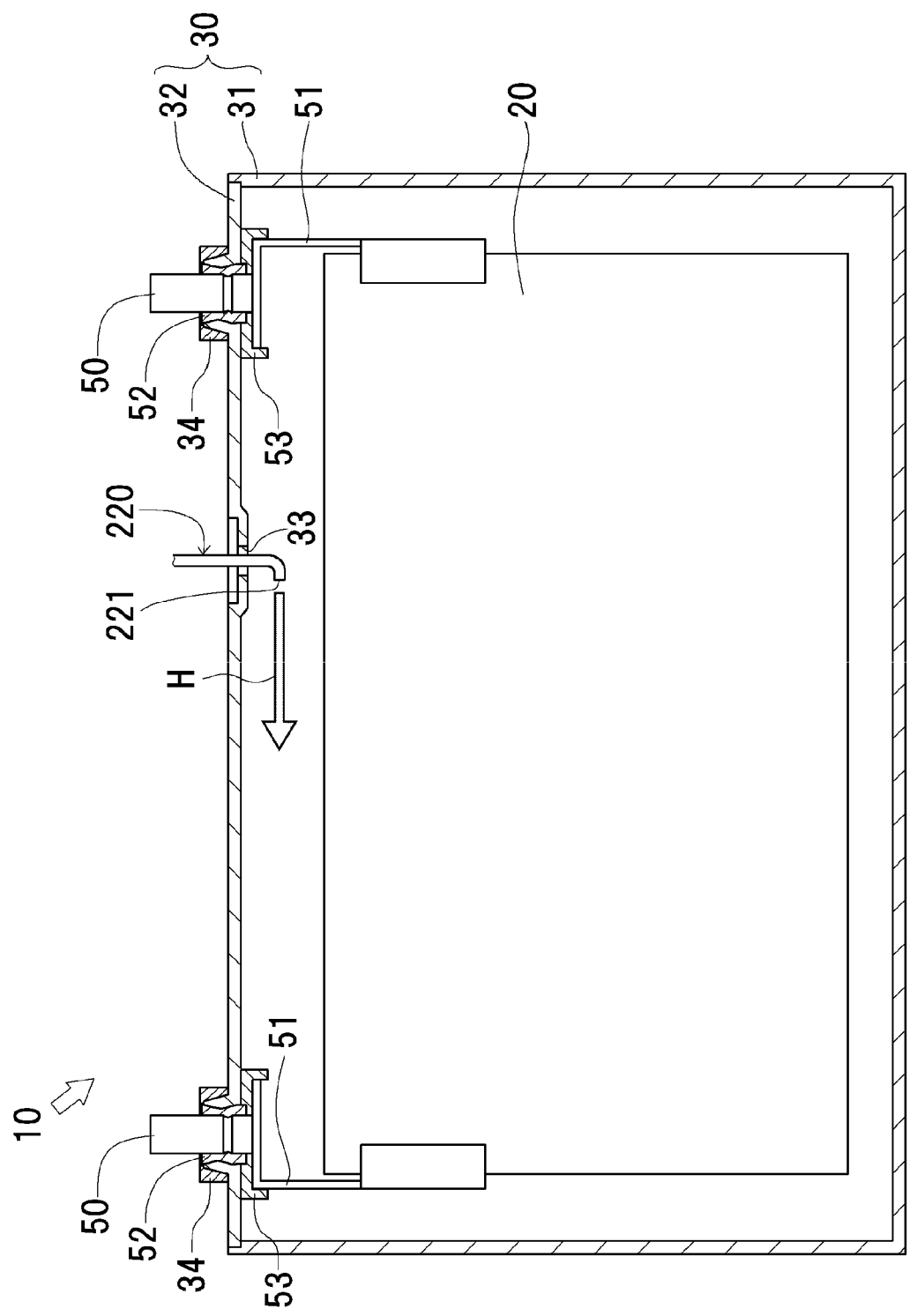
FIG. 9 shows how the detection gas is introduced through a curved nozzle.

In the experiment, a curved nozzle 220 shown in FIG. 9 and the linear nozzle 120 shown in FIG. 3 were used, the lower end (tip) of the curved nozzle 220 curving at an angle of approximately 90° with respect to the middle portion thereof vertically extending so as to horizontally extending, the nozzle 120 vertically extending.

In the experiment, a plurality of test pieces were produced in the following manner: as shown in FIG. 9, the curved nozzle 220 was inserted into the pouring hole 33 so that a jetting port 221 was situated inside the exterior 30, the helium gas H was jetted with the jetting port 221 facing the left side, and the pouring hole 33 was sealed.

Figure 10A:
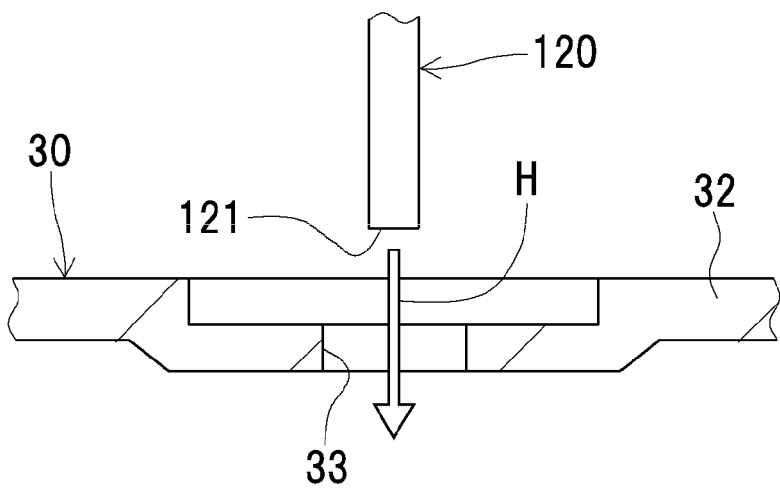
FIG. 10A shows the first comparative example.
Figure 10B:
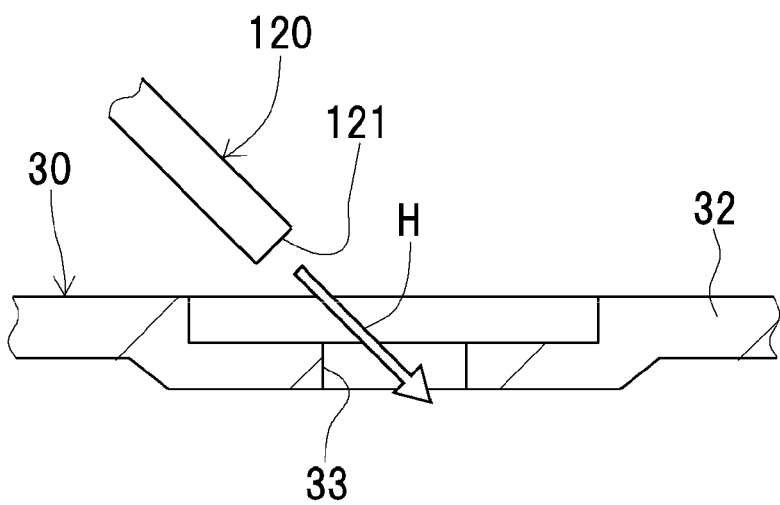
FIG. 10B shows the second comparative example.
Figure 10C:
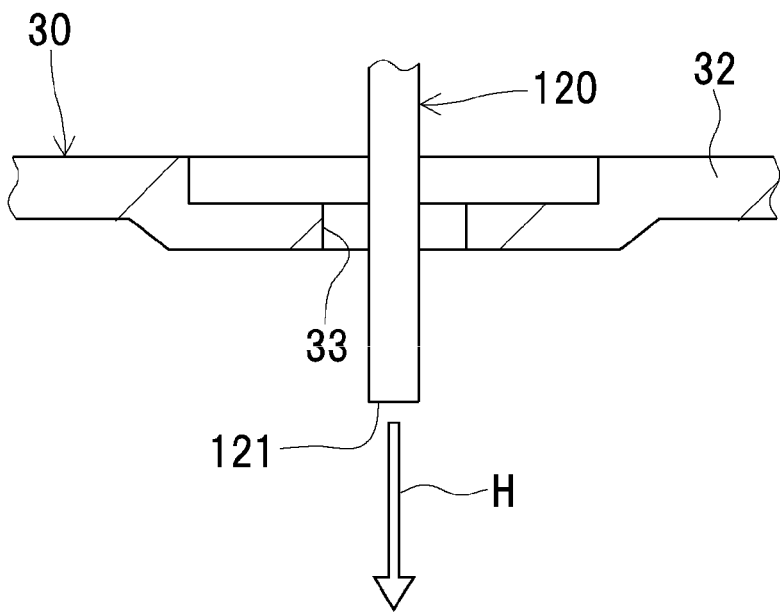
FIG. 10C shows the third comparative example.

In the experiment, a plurality of test pieces as first comparative examples were produced in the following manner: as shown in FIG. 10(*a*), the jetting port 121 formed in the lower end of the linear nozzle 120 was arranged above the pouring hole 33, the helium gas H was downwardly jetted from the jetting port 121, and the pouring hole 33 was sealed.

In the experiment, a plurality of test pieces as second comparative examples were produced in the following manner: as shown in FIG. 10(*b*), the jetting port 121 formed in the lower end of the linear nozzle 120 was arranged above the pouring hole 33 with the nozzle 120 inclined at a predetermined angle with respect to the vertical direction, the helium gas H was downwardly jetted from the jetting port 121, and the pouring hole 33 was sealed.

In the experiment, a plurality of test pieces as third comparative examples were produced in the following manner: as shown in FIG. 10(*c*), the jetting port 121 of the linear nozzle 120 was arranged inside the exterior 30, the helium gas H was jetted with the jetting port 121 in the lower end of the linear nozzle 120 facing the lower side, and the pouring hole 33 was sealed.

In the experiment, the helium gas H was introduced so that the density of the helium gas in the exterior 30 of each test piece in the case of using the curved nozzle 220, and the density of the helium gas in the exterior 30 of each of the test pieces in the first to third comparative examples were same.

In the experiment, the helium gas H was introduced into the exterior 30 whose side faces were transparent under such a condition. Then, by the structure shown in FIG. 7, variation of density inside the exterior 30 was visualized, and photographs showing the state of the variation ware taken.

In the experiment, a through hole was formed in the exterior 30 after sealing the pouring hole 33, and the head of the helium-density measuring instrument was quickly pressed against the through hole to measure the density of the helium gas.

Moreover, in the experiment, the rate of the utilization of the helium gas was calculated based on the amount of the jetted helium gas, the measured density of the helium gas, and the like.

The result of the visualization in the first comparative example shown in FIG. 10(*a*) confirmed that part of the helium gas H collided against the external wall of the exterior 30, and part of the helium gas H could not be introduced into the exterior 30.

The result of the visualization in the first comparative example confirmed that a jetting flow of the helium gas H temporarily introduced into the exterior 30 collided against the electrode body, and thereby was returned to the outside of the pouring hole 33.

The result of the visualization in the second comparative example shown in FIG. 10(*b*) confirmed that the helium gas H introduced into the exterior 30 was not returned to the outside of the pouring hole 33, but part of the jetted helium gas H collided against the external wall of the exterior 30, and thereby part of the helium gas H could not be introduced into the exterior 30.

The result of the visualization in the third comparative example shown in FIG. 10(*c*) confirmed that part of the jetted helium gas H did not collide against the external wall of the exterior 30, but a jetting flow of the helium gas H temporarily introduced into the exterior 30 collided against the electrode body, and thereby the helium gas H was returned to the outside of the pouring hole 33.

On the other hand, in the case of introducing the helium gas H with the curved nozzle 220, the result of the visualization confirmed that the helium gas H was deeply introduced into the exterior 30.

In other words, in the case of introducing the helium gas H with the curved nozzle 220, part of the jetted helium gas H did not collide against the external wall of the exterior 30, and the helium gas H introduced into the exterior 30 was not returned to the outside of the pouring hole 33.

Figure 11A:
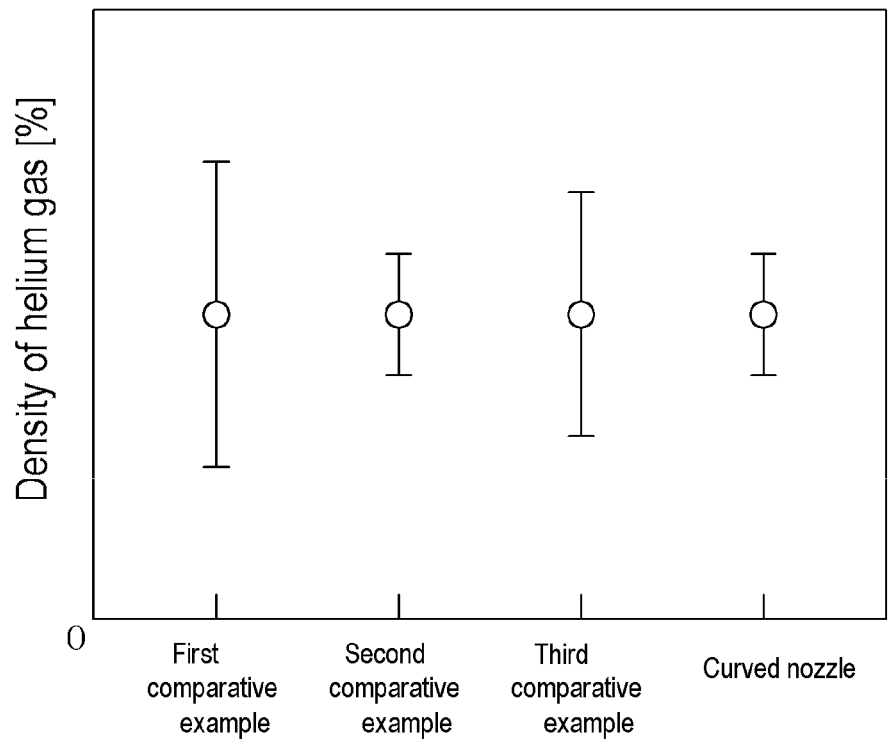
FIG. 11A shows results of measuring density of the helium gas.
Figure 11B:
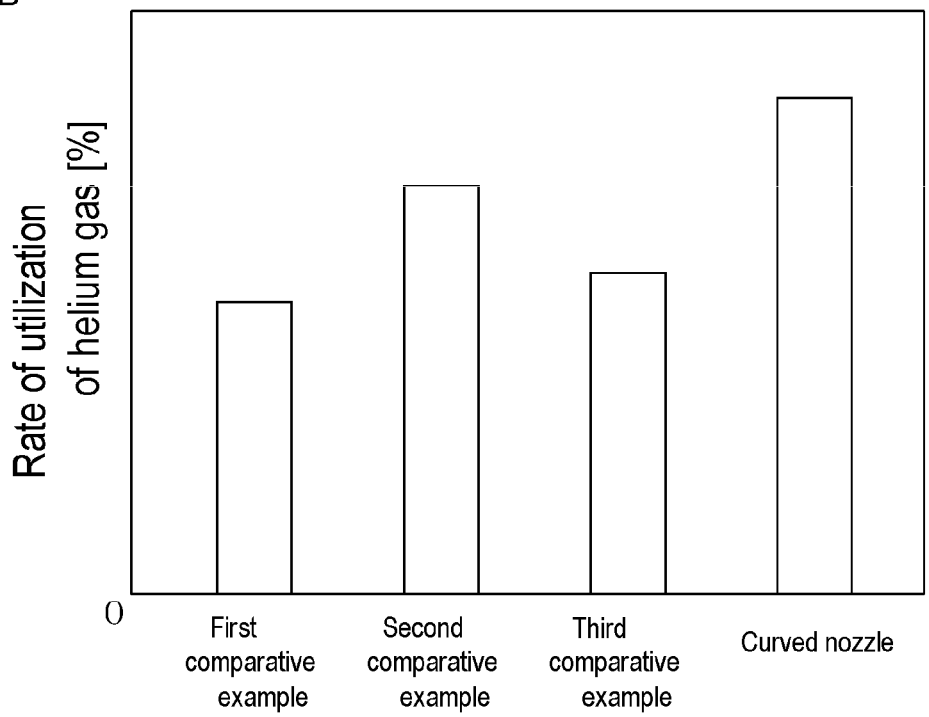
FIG. 11B shows results of calculating rate of utilization of the helium gas.

Therefore, as shown in FIG. 11, the variation of the density of the helium gas, and the rate of the utilization of the helium gas in the case of using the curved nozzle 220 were improved, compared with the variation of the density of the helium gas, and the rate of the utilization of the helium gas in the first to third comparative examples.

The result of the experiment mentioned above shows that the manufacturing method makes it possible to reduce the leakage of the helium gas by jetting the helium gas H leftward of the exterior 30 using the curved nozzle 220.

Moreover, the manufacturing method makes it possible to deeply introduce the helium gas H into the exterior 30 by jetting the helium gas H leftward of the exterior 30 using the curved nozzle 220, and consequently to introduce the helium gas H with high density into the exterior 30.

As shown in FIG. 9, the pouring hole 33 is formed at the portion of the lid part 32 of the exterior 30 slightly to the right of the middle portion thereof in the right-left direction. Moreover, in the experiment, the helium gas H is jetted leftward with the curved nozzle 220.

In other words, the manufacturing method includes the introducing step for introducing the helium gas H into the exterior 30 by arranging the jetting port 221 of the curved nozzle 220 capable of jetting the helium gas H (or the mixed gas G) inside the exterior 30, and by jetting the helium gas H (or the mixed gas G) with the jetting port 221 of the curved nozzle 220 facing the farthest side of the exterior 30. In this manner, the manufacturing method makes it possible to reduce the leakage of the helium gas. In addition, the manufacturing method makes it possible to introduce the helium gas H with high density into the exterior 30.

Note that the farthest side of the exterior 30 means predetermined one side of the exterior 30 to which the helium gas H (or the mixed gas G) can be jetted farthest when the helium gas H (or the mixed gas G) is jetted from the curved nozzle 220. In other words, the farthest side of the exterior 30 is the side face of the exterior 30 farthest away from the jetting port 221 of the curved nozzle 220.

In the case where the pouring hole is formed at the middle of the exterior in the right-left direction, the curved nozzle may jet the helium gas in one of right and left directions (i.e., one of directions parallel to the longitudinal direction of the exterior). In this case, each of the right and left sides of the exterior corresponds to the farthest side of the exterior.

In the case where the pouring hole is formed at the center of a member in the shape of substantially a bottomed cylinder, the curved nozzle may jet the helium gas in any direction of the horizontal direction. In this case, the whole inner surface of the exterior corresponds to the farthest side of the exterior.

The shape of the curved nozzle is not limited to the shape shown in FIG. 9 as long as the curved nozzle can jet the helium gas (or the mixed gas) toward the farthest side of the exterior when the jetting port is arranged inside the exterior.

FIG. 11 shows the variation of the density of the helium gas, and the rate of the utilization of the helium gas in the case where the pouring hole 33 is quickly sealed after the introduction of the helium gas H.

If the pouring hole 33 is quickly sealed, a time for which the helium gas H leaks from the pouring hole 33 can be reduced, and consequently the leakage of the helium gas can be reduced. Moreover, a time from supplying the helium gas H until sealing the pouring hole 33 can be uniform, and consequently the variation of the leakage of the helium gas can be minimized.

In the manufacturing method, it is preferable that the pouring hole 33 is quickly sealed after the introduction of the helium gas H.

Specifically, in the manufacturing method, a helium tank, a nozzle and the like are arranged in the vicinity of a laser beam welding device for sealing the pouring hole 33, and the pouring hole 33 is quickly sealed without conveying the battery to a distant place after the introduction of the helium gas H.

In this manner, the manufacturing method makes it possible to improve the rate of the utilization of the helium gas, and the rate of the erroneous determination.

Thus, in the manufacturing method, the sealing step is performed immediately after the introducing step.

Note that performing the sealing step immediately after the introducing step means performing the sealing step within a predetermined time after the introducing step without performing another step between the introducing step and the sealing step. The predetermined time is set based on, for example, the result of the measurement of the leakage of the helium gas depending on a time elapsed after the introduction of the helium gas H.

Then, a method for manufacturing the battery 10 according to a fourth embodiment (hereinafter, referred to simply as a "manufacturing method") is described.

The manufacturing method according to the fourth embodiment is a step for manufacturing the same battery as the battery 10 according to the first embodiment (see FIG. 1).

Figure 12:
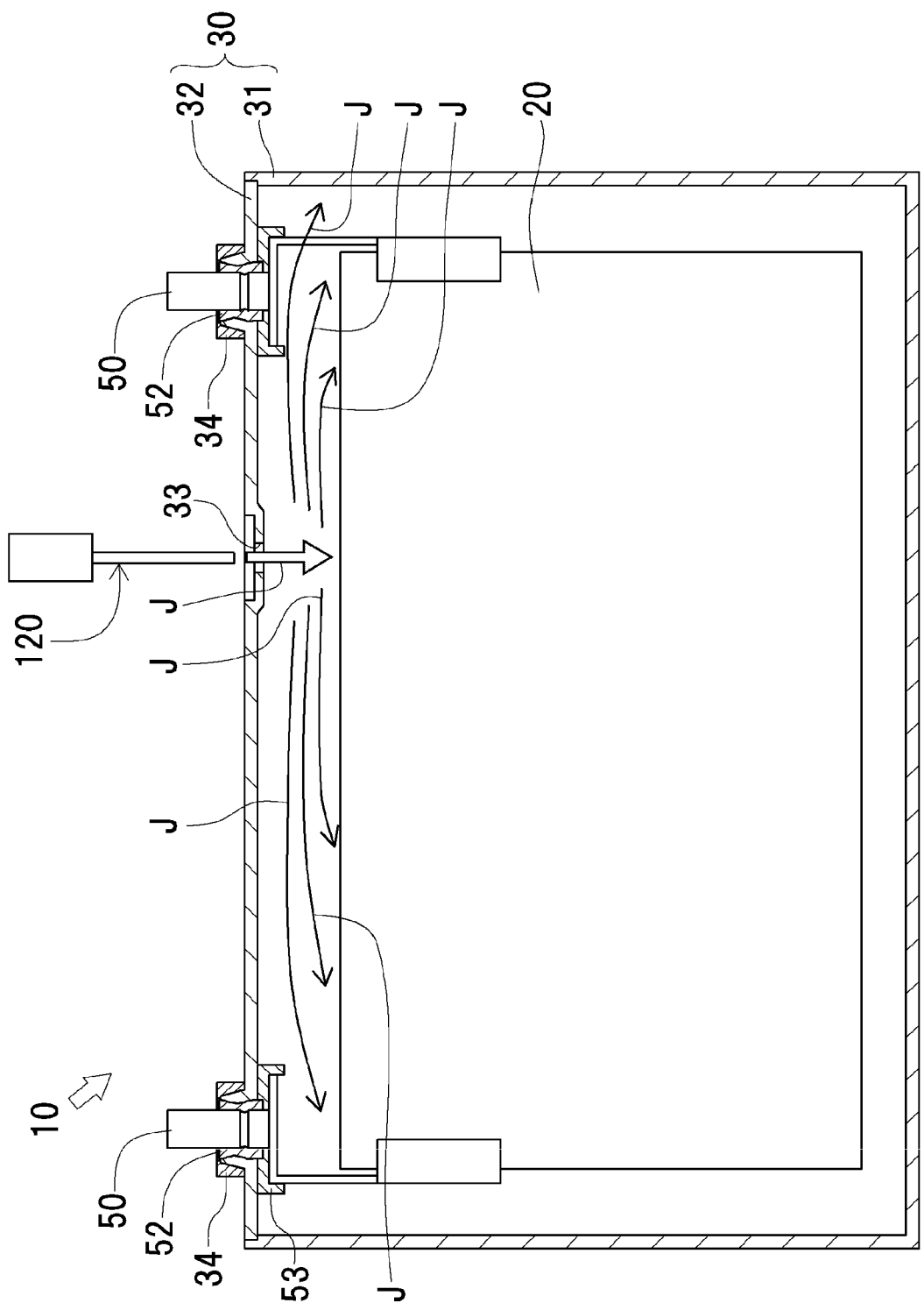
FIG. 12 shows how detection gas according to a fourth embodiment is introduced.

As shown in FIG. 12, the manufacturing method according to the fourth embodiment differs from the manufacturing method according to the first embodiment in introducing mixed gas J heavier than the mixed gas G according to the first embodiment. Therefore, hereinafter, the mixed gas J is specifically explained, and explanation for the other part is omitted.

In the manufacturing method according to the fourth embodiment, the mixed gas J is jetted (see arrow J shown below the nozzle 120 in FIG. 12), using the nozzle 120 used in the first embodiment, into the exterior 30 into which the electrolyte solution E is poured.

At this time, in the manufacturing method, as in the case of jetting the mixed gas G according to the first embodiment, the nozzle 120 is arranged above the pouring hole 33 to jet the mixed gas J.

In the manufacturing method according to the fourth embodiment, the mixed gas J is jetted under an air atmosphere.

The mixed gas J jetted in the fourth embodiment is made by mixing the helium gas H and nitrogen gas whose specific gravity is larger than that of the helium gas H at a predetermined rate. Thus, in the manufacturing method according to the fourth embodiment, the average of the specific gravity of the mixed gas J becomes larger than the specific gravity of the helium gas H.

The nitrogen gas does not adversely affect battery performance. In addition, the nitrogen gas is easily obtained, and the price thereof is low. Therefore, the nitrogen gas is suitable for the generation of the mixed gas J.

As mentioned previously, gas such as air and the hydrocarbon gas which is a volatilized component of the electrolyte solution E is present inside the exterior 30.

Therefore, it is possible that the average of the specific gravity of the mixed gas in which a mixing ratio of the nitrogen gas is small, namely, the mixed gas containing a lot of the helium gas H is not sufficiently large relative to an average of specific gravity of air and gas inside the exterior 30 (hereinafter, referred to as a "gaseous body inside the exterior 30"). In other words, in this case, it is possible that a part of the mixed gas cannot enter the exterior 30, and the other part of the mixed gas having entered the exterior 30 cannot also sink in the exterior 30.

Accordingly, in the manufacturing method according to the fourth embodiment, the mixing ratio of the nitrogen gas is increased to some extent (until approximately 60%) relative to the helium gas H to increase the average of the specific gravity of the mixed gas J to some extent. In addition, a pressure is applied to the mixed gas J to make the mixed gas J dense.

Specifically, in the manufacturing method, the pressure at which the mixed gas J is jetted is adjusted to apply a predetermined pressure to the mixed gas J, and thereby the average of the specific gravity of the mixed gas J becomes larger than that of the gaseous body inside the exterior 30.

In the manufacturing method according to the fourth embodiment, the average of the specific gravity of the mixed gas J means a specific gravity calculated based on a specific gravity found from a mixing ratio and a specific gravity of gas constituting the mixed gas J, a pressure applied to the mixed gas J, a temperature of the mixed gas J, and the like. This is true for the average of the specific gravity of the gaseous body inside the exterior 30.

In this manner, the manufacturing method according to the fourth embodiment allows most of the mixed gas J to enter the exterior 30, and allows the mixed gas J having entered the exterior 30 to sink in the exterior 30 (see arrows J extending in the right and left directions in FIG. 12).

Therefore, the manufacturing method according to the fourth embodiment makes it possible to further reduce the leakage of the helium gas during and after introducing the helium gas H into the exterior 30.

Thus, the manufacturing method according to the fourth embodiment makes it possible to reduce the variation of the density of the helium gas inside the exterior 30 in the leak testing step.

Consequently, the manufacturing method makes it possible to further reduce the rate of the erroneous determination, and to further improve robustness of the leak testing step (see FIG. 5).

Moreover, the manufacturing method according to the fourth embodiment makes it possible to further improve the rate of the utilization of the helium gas, and consequently to further reduce cost required for the leak testing step. In addition, the manufacturing method makes it possible to introduce the helium gas H with higher density into the exterior 30.

Described below is result of experiment on the density of the helium gas and the rate of the utilization of the helium gas for the case of introducing the helium gas H by the manufacturing method according to the fourth embodiment.

In the experiment, the mixed gas J was prepared by mixing the helium gas H and the nitrogen gas at a ratio of 4 to 6. Then, the mixed gas J was jetted at such a high pressure that the average of the specific gravity of the mixed gas J was larger than that of the gaseous body inside the exterior 30.

In the experiment, a plurality of test pieces were produced by jetting the mixed gas J from the nozzle 120 shown in FIG. 12, and then by sealing the pouring hole 33.

In the experiment, after sealing the pouring hole 33, the density of the helium gas was measured in the same manner as the experiments in the first to third embodiments, and the rate of the utilization of the helium gas was calculated.

In the experiment, the density and the rate of the utilization of the helium gas of the object to be compared, which had been measured in the experiment in each of the first to third embodiments, and the density and the rate of the utilization of the helium gas in the fourth embodiment were comparatively evaluated.

As mentioned previously, the test piece as the object to be compared is a test piece into which the helium gas H having been jetted from the nozzle 120 has been introduced. In other words, the test piece as the object to be compared corresponds to a test piece into which the mixed gas having the average of the specific gravity smaller than the average of the gaseous body inside the exterior 30 is introduced.

Figure 13A:
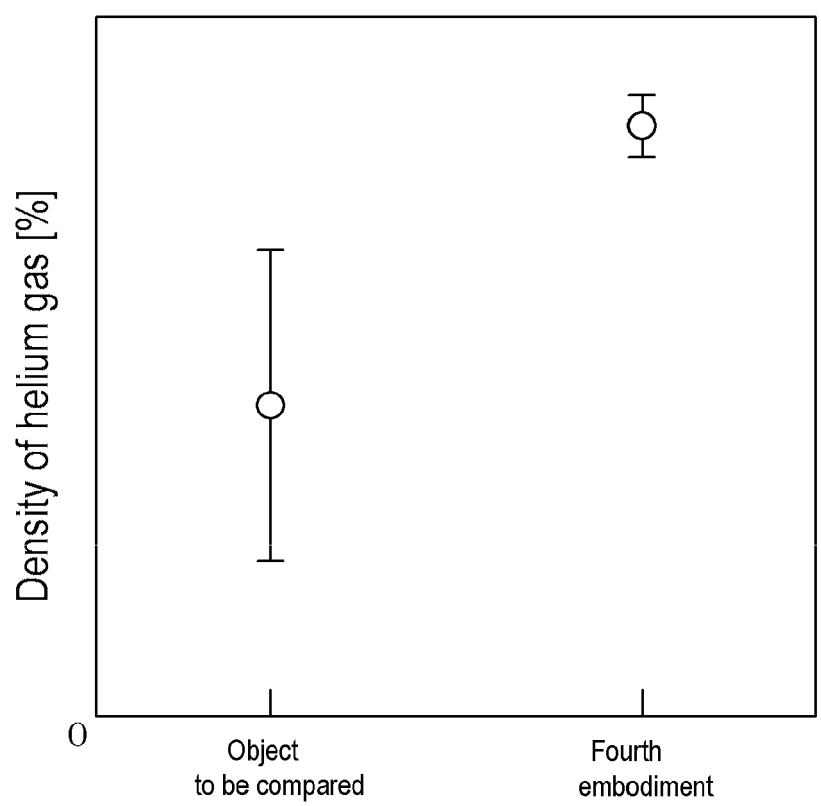
FIG. 13A shows a result of measuring density of the helium gas.
Figure 13B:
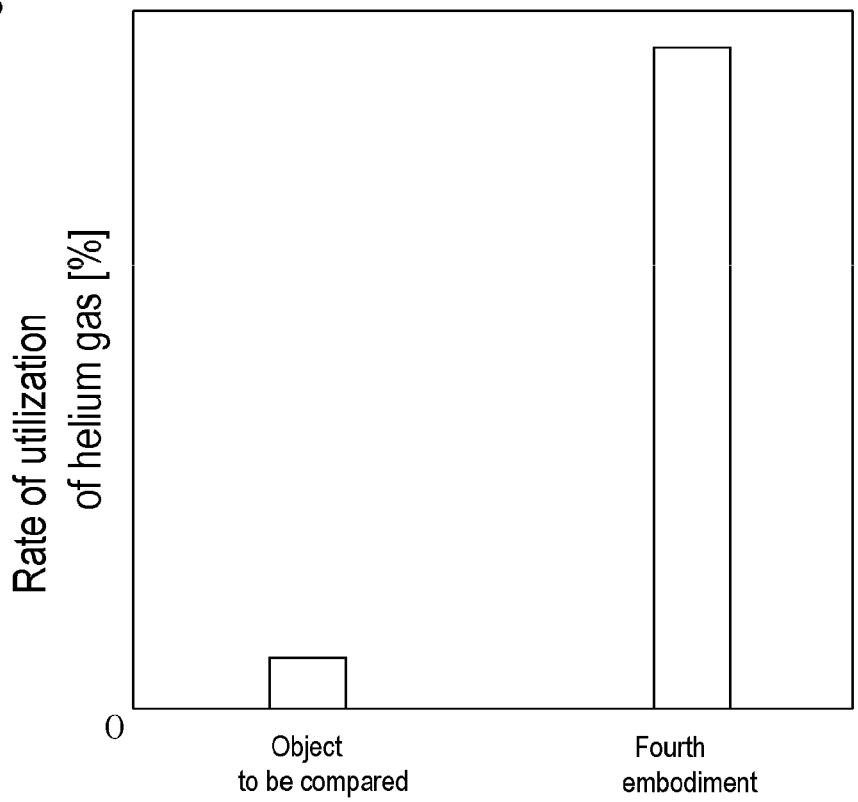
FIG. 13B shows a result of calculating rate of utilization of the helium gas.

As shown in FIG. 13, the density and the rate of the utilization of the helium gas in the fourth embodiment were greatly improved, compared with the density and the rate of the utilization of the helium gas of the object to be compared.

The result of the experiment mentioned above shows that the manufacturing method according to the fourth embodiment makes it possible to further reduce the leakage of the helium gas by making the average of the specific gravity of the mixed gas J larger than the average of the specific gravity of the gaseous body inside the exterior 30.

In the manufacturing method, it is not necessary to mix the helium gas and the nitrogen gas.

In the case where the mixed gas is prepared by mixing the helium gas and the nitrogen gas in the manufacturing method, it is not necessary to mix the helium gas and the nitrogen gas at a mixing ratio of 4 to 6. However, it is preferable that the mixing ratio of the nitrogen gas is 6 or more and less than 10 in terms of the fact that an adjustment amount of the average of the specific gravity of the mixed gas becomes small.

Then, a method for manufacturing the battery 10 according to a fifth embodiment (hereinafter, referred to simply as a "manufacturing method") is described.

The manufacturing method according to the fifth embodiment is a step for manufacturing the same battery as the battery 10 according to the first embodiment (see FIG. 1).

The manufacturing method according to the fifth embodiment differs from the manufacturing method according to the first embodiment in jetting not the mixed gas G but the helium gas H (specifically, in jetting the helium gas H without performing the processing step for increasing the apparent specific gravity of the helium gas H), and in a condition under which the helium gas H is jetted.

Therefore, hereinafter, the condition under which the helium gas H is jetted is specifically explained, and explanation for the other part is omitted.

Figure 14A:
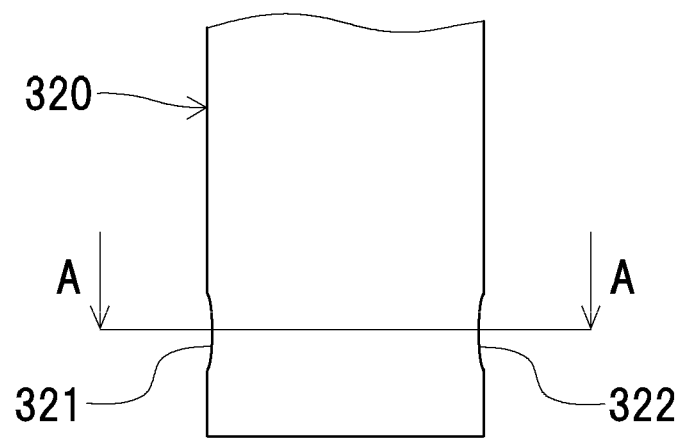
FIG. 14A is an enlarged side view of a tip.
Figure 14B:
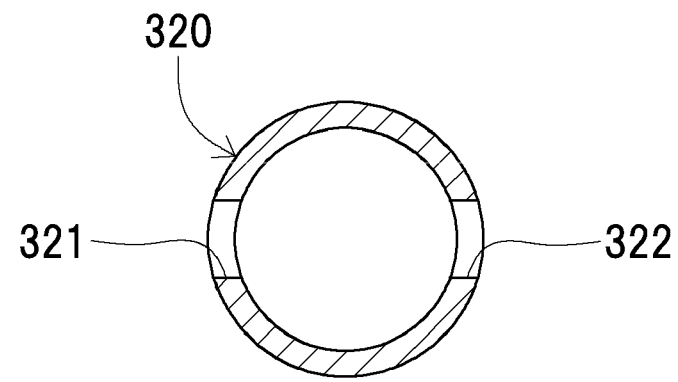
FIG. 14B is a sectional view taken along line A-A in FIG. 14A.

In the manufacturing method according to the fifth embodiment, the helium gas H is introduced into the exterior 30 using a nozzle 320 shown in FIG. 14.

As shown in FIG. 14, the nozzle 320 has two openings formed in the lower portion of the side surface, and the bottom surface of the nozzle 320 is closed. In the nozzle 320, the two openings are formed as jetting ports 321 and 322.

The jetting ports 321 and 322 are through holes each of which is formed in substantially a circle seen from the front thereof, namely, from the position facing the jetting ports 321 and 322. The jetting ports 321 and 322 are of substantially equal inner diameter, and are arranged at equal intervals around the axis of the nozzle 320.

The nozzle 320 is configured to jet the helium gas H from the jetting ports 321 and 322 in the right-left direction in FIG. 14, namely, in the horizontal direction.

Figure 15:
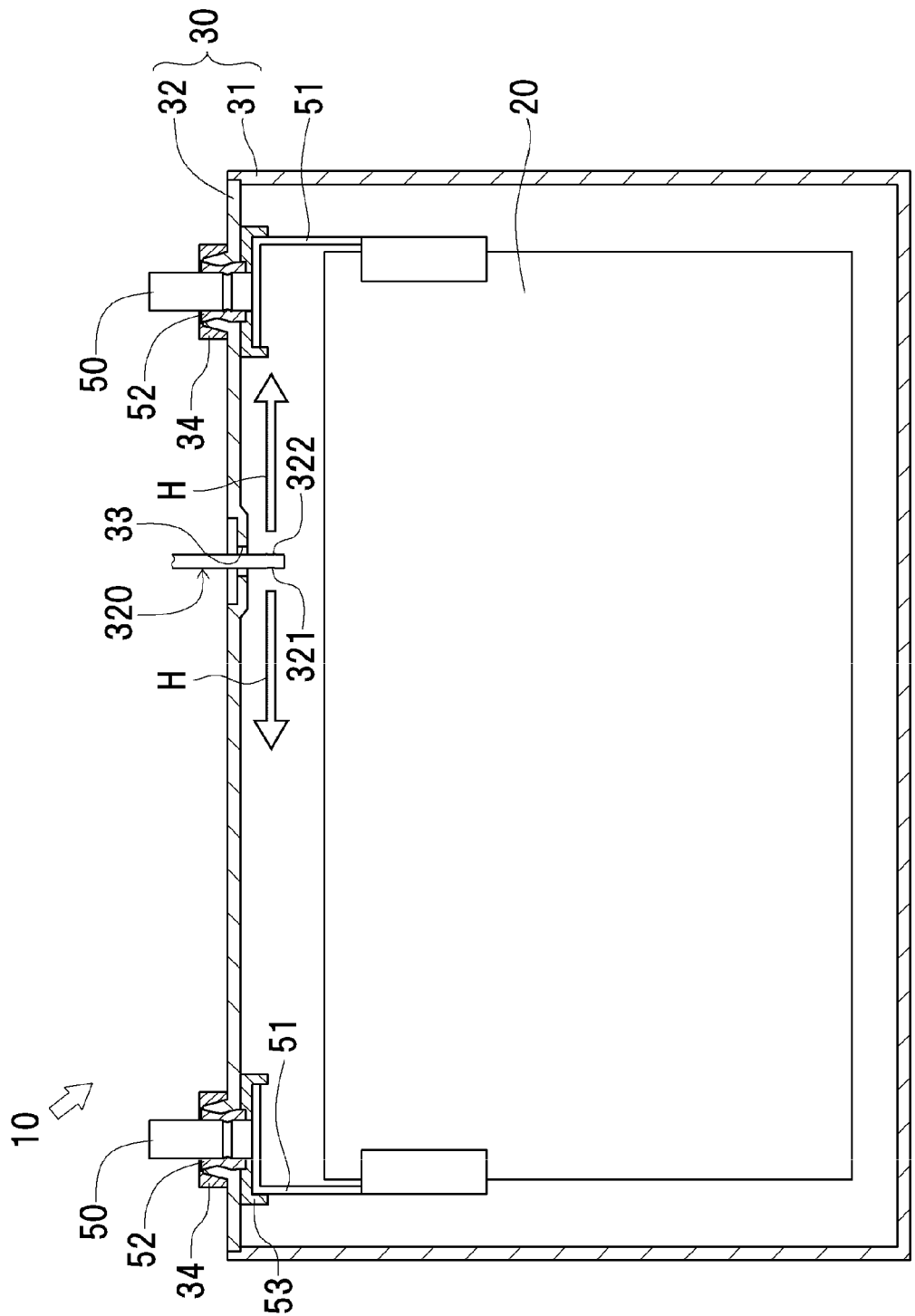
FIG. 15 shows how detection gas according to the fifth embodiment is introduced.

As shown in FIG. 15, in the manufacturing method according to the fifth embodiment, the nozzle 320 is downward moved to be inserted into the pouring hole 33, and the jetting ports 321 and 322 are arranged inside the exterior 30.

Then, in the manufacturing method, the helium gas H is jetted from the jetting ports 321 and 322 of the nozzle 320 in the two directions of the right and left directions in FIG. 15.

Thus, in the fifth embodiment, an opening through which the jetting ports 321 and 322 of the nozzle 320 are arranged inside the exterior 30 is the pouring hole 33.

Moreover, one face of the exterior 30 in which the pouring hole 33 is formed is the upper face of the exterior 30, namely, the lid part 32.

In the manufacturing method according to the fifth embodiment, the helium gas H is jetted from the jetting ports 321 and 322 arranged inside the exterior 30 toward the right and left side faces of the exterior 30.

At this time, in the manufacturing method, the helium gas H is jetted in the right-left direction, namely, in a direction parallel to the longitudinal direction of the exterior 30.

In the case of jetting the helium gas H with light specific gravity as in the manufacturing method according to the fifth embodiment, it is possible that the helium gas H stagnates in the exterior 30 due to large difference of specific gravity between the helium gas H and the gaseous body inside the exterior 30.

In other words, in this case, turbulent flow is generated, and as a result, it is possible that the gaseous body inside the exterior 30 cannot be replaced with the helium gas H due to increase in the leakage of the helium gas during the introduction of the helium gas H.

Accordingly, in the manufacturing method according to the fifth embodiment, the helium gas H is jetted in the two directions of the right and left directions in FIG. 15 to generate aerial currents at two places inside the exterior 30 to the right and left of the pouring hole 33.

Thus, in the manufacturing method, flows of the gaseous body inside the exterior 30 and the helium gas H are accelerated to suppress the stagnation of the helium gas H inside the exterior 30. In other words, in the manufacturing method, the generation of the turbulent flow inside the exterior 30 is suppressed, and thereby the replacement of the helium gas H inside the exterior 30 is promoted.

In this manner, the manufacturing method according to the fifth embodiment makes it possible to further reduce the leakage of the helium gas during the introduction of the helium gas H, compared with the case of using the curved nozzle 220 shown in FIG. 9. Therefore, the manufacturing method makes it possible to introduce the helium gas H with higher density into the exterior 30.

In other words, the manufacturing method makes it possible to greatly improve the rate of the utilization of the helium gas, and consequently to further reduce cost required for the leak testing step.

Moreover, the manufacturing method according to the fifth embodiment makes it possible to suppress the stagnation of the helium gas H in the vicinity of the pouring hole 33 caused by the turbulent flow. In other words, the manufacturing method allows the helium gas H to reach a deep place of the exterior 30, namely, a place distant from the pouring hole 33.

In particular, in the manufacturing method according to the fifth embodiment, jetting the helium gas H in the right-left direction makes the helium gas H difficult to collide against the electrode body. As a result, the helium gas H reaches a deeper place of the exterior 30.

In other words, the manufacturing method according to the fifth embodiment makes it possible to reduce the leakage of the helium gas during and after introducing the helium gas H into the exterior 30, and consequently to reduce the variation of the density of the helium gas inside the exterior 30 in the leak testing step.

Therefore, the manufacturing method makes it possible to further reduce the rate of the erroneous determination, and to further improve robustness of the leak testing step (see FIG. 5).

Thus, the manufacturing method according to the fifth embodiment includes the introducing step for introducing the helium gas H into the exterior 30 by arranging the jetting ports 321 and 322 of the nozzle 320 capable of jetting the helium gas H inside the exterior 30, and by jetting the helium gas H with the jetting ports 321 and 322 of the nozzle 320 facing the farthest side of the exterior 30.

Moreover, in the manufacturing method according to the fifth embodiment, in the introducing step, the helium gas H is jetted in a direction parallel to the lid part 32 toward two sides of the farthest side of the exterior 30 and the opposite side of the farthest side of the exterior 30.

Note that the direction parallel to the lid part 32 means a direction perpendicular to the thickness direction of the lid part 32, namely, a direction along the plate surface of the lid part 32. For example, the direction parallel to the lid part 32 means the right-left direction in FIG. 15.

Moreover, the opposite side of the farthest side of the exterior 30 means a side face opposed to predetermined one side face of the exterior 30 to which the helium gas H can be jetted farthest, namely, the right side face of the exterior 30 in the present embodiment.

In the case of introducing the helium gas into an exterior which is formed in substantially a rectangle, in plan view, whose longitudinal direction corresponds to the right-left direction, and which has the pouring hole formed at the middle of the exterior in the right-left direction, the opposite side of one of the right and left side faces of the exterior to which the helium gas is jetted as the farthest side of the exterior, namely, the other of the right and left side faces corresponds to the opposite side of the farthest side of the exterior.

Moreover, in the case of introducing the helium gas into an exterior in the shape of substantially a bottomed cylinder, which has the pouring hole formed at the center of the exterior, an opposite side of any one side to which the helium gas is jetted as the farthest side of the exterior corresponds to the opposite side of the farthest side of the exterior.

Described below is result of experiment on the density of the helium gas for the case of introducing the helium gas H by the manufacturing method according to the fifth embodiment.

In the experiment, a plurality of test pieces were produced by jetting the helium gas H from the nozzle 320 shown in FIG. 15, and then by sealing the pouring hole 33.

In the experiment, after sealing the pouring hole 33, the density of the helium gas was measured in the same manner as the experiments in the first to third embodiments.

In the experiment, the density of the helium gas of the object to be compared, which had been measured in the experiment in each of the first to third embodiments, and the density of the helium gas of the test piece in the fifth embodiment were comparatively evaluated.

Figure 16:
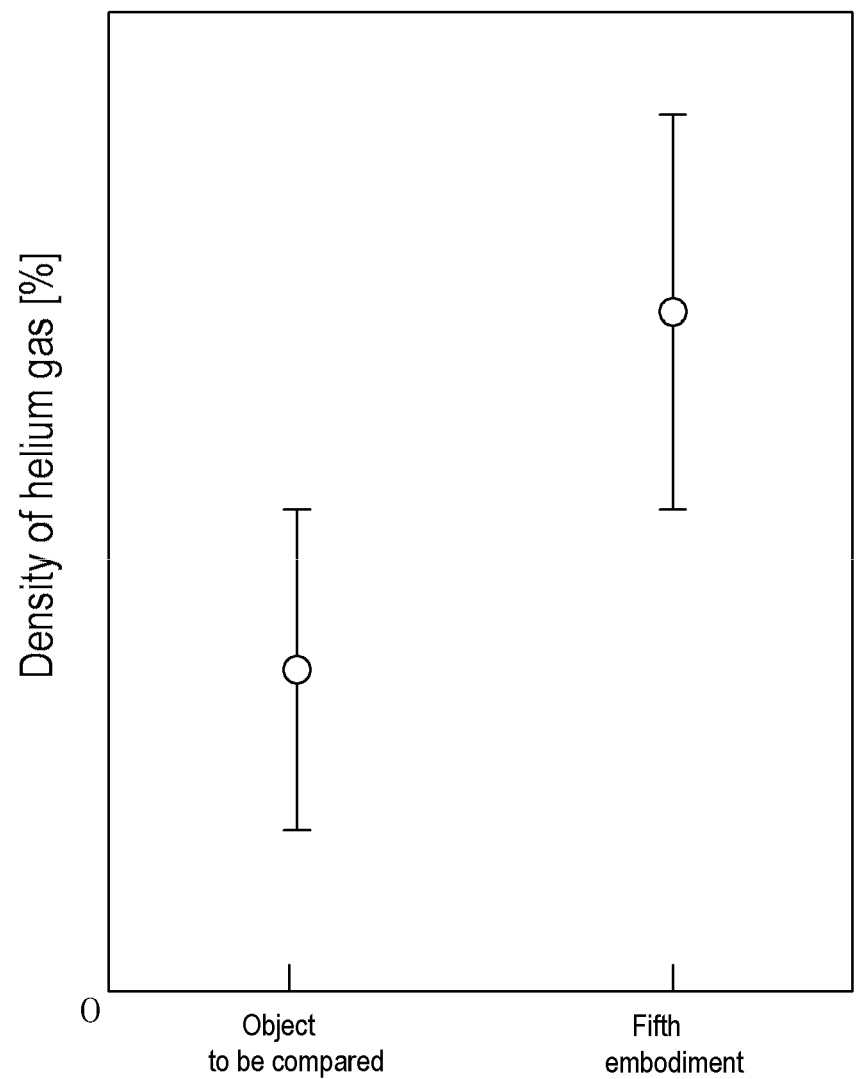
FIG. 16 shows a result of measuring density of the helium gas in a manufacturing method according the fifth embodiment.

As shown in FIG. 16, the minimum of the density of the helium gas in the fifth embodiment was substantially equal to the maximum of the density of the helium gas of the object to be compared. In other words, the density of the helium gas in the fifth embodiment was greatly improved, compared with the density of the helium gas of the object to be compared.

This shows that the manufacturing method according to the fifth embodiment allows the helium gas H to reach a deep place of the exterior 30 without leaking the helium gas H during the introduction of the helium gas.

As show in FIG. 16, the variation (length along the vertical axis) of the density of the helium gas of the object to be compared is slightly smaller than that of the density of the helium gas in the fifth embodiment.

This is because the density of the helium gas in the fifth embodiment is much higher than that of the object to be compared, and thereby an amount of the helium gas H which leaks out until sealing the pouring hole 33 becomes large.

Therefore, if an amount of the helium gas jetted into the exterior 30 of the object to be compared is increased to increase the density of the helium gas of the object to be compared to the density of the helium gas in the fifth embodiment, it appears that the variation of the density of the helium gas of the object to be compared is larger than that of the density of the helium gas in the fifth embodiment.

On the other hand, if an amount of the helium gas jetted into the exterior 30 in the fifth embodiment is reduced to reduce the density of the helium gas in the fifth embodiment to the density of the helium gas of the object to be compared, it appears that the variation of the density of the helium gas in the fifth embodiment is smaller than that of the density of the helium gas of the object to be compared.

The result of the experiment mentioned above shows that the manufacturing method according to the fifth embodiment makes it possible to, by jetting the helium gas H in the two directions of the right and left directions, introduce the helium gas H with high density into the exterior 30, and to reduce the variation of the density of the helium gas.

Then, described is the manufacturing method according to a first modified example differing from the manufacturing method according to the fifth embodiment in the condition under which the helium gas H is jetted.

As shown in FIG. 17, in the manufacturing method according to the first modified example, the helium gas H is jetted using a nozzle 420 instead of the nozzle 320 in the fifth embodiment.

Figure 17A:
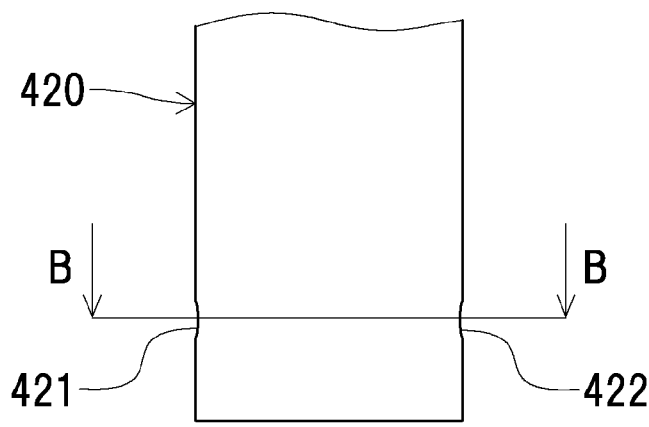
FIG. 17A is an enlarged side view of a tip.
Figure 17B:
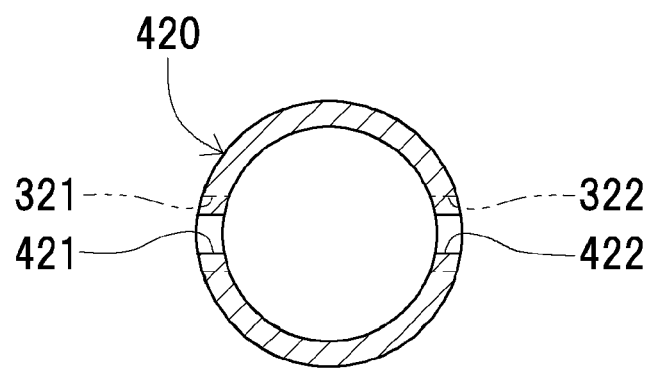
FIG. 17B is a sectional view taken along line B-B in FIG. 17A.

As shown in FIGS. 17(a) and 17(b), the nozzle 420 in the first modified example has, similarly to the nozzle 320 in the fifth embodiment, jetting ports 421 and 422 formed in opposite sides of the lower portion of the nozzle 420.

The levels (vertical positions) of the jetting ports 421 and 422 are same. The inner diameters of the jetting ports 421 and 422 are smaller than those of the jetting ports 321 and 322 of the nozzle 320 (see the jetting ports 321 and 322 indicated by two-dot chain line in FIG. 17(b)).

In other words, the nozzle 420 in the first modified example is configured to jet the helium gas H at a velocity higher (more strongly) than that of the nozzle 320 in the fifth embodiment.

Figure 17C:
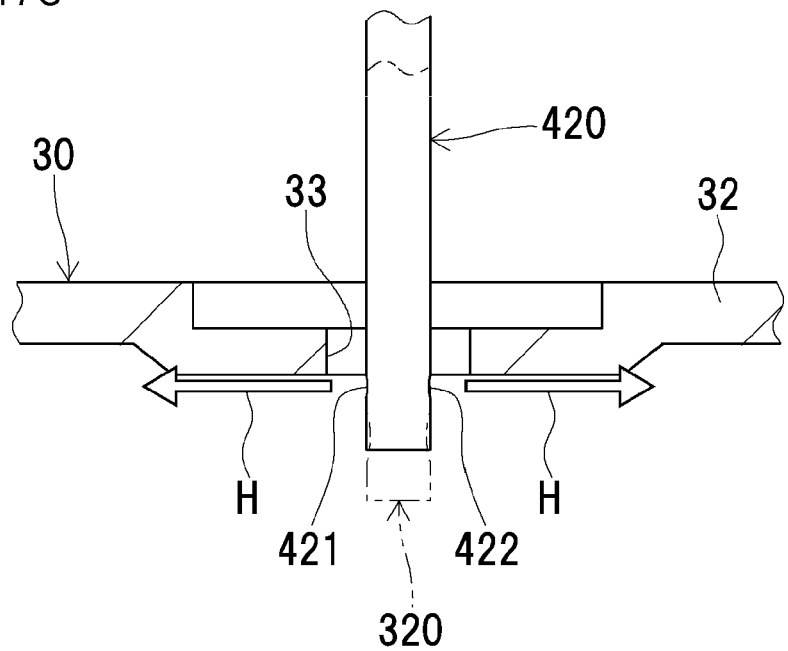
FIG. 17C is a side view showing a level when the helium gas is jetted.

As shown in FIG. 17(c), in the manufacturing method according to the first modified example, the above-mentioned nozzle 420 is inserted into the pouring hole 33, and the helium gas H is jetted at a velocity higher than that of the nozzle 320 in the fifth embodiment.

In this manner, the manufacturing method according to the first modified example makes it possible to suppress the stagnation of the helium gas H inside the exterior 30 caused by insufficiency of the force of the helium gas H. In other words, the manufacturing method allows the helium gas H to more reliably reach a deep place of the exterior 30, and consequently makes it possible to improve directivity of the helium gas H.

Moreover, the manufacturing method according to the first modified example makes it possible to suppress the generation of the turbulent flow inside the exterior 30 caused by the stagnation of the helium gas H inside the exterior 30.

Therefore, the manufacturing method according to the first modified example makes it possible to reduce the leakage of the helium gas during and after introducing the helium gas H, and consequently to reduce the variation of the density of the helium gas inside the exterior 30 in the leak testing step.

In the manufacturing method according to the first modified example, the helium gas H is jetted by the nozzle 420 at a level higher than the level of the nozzle 320 in the fifth embodiment (see the nozzle 320 in the fifth embodiment indicated by two-dot chain line in FIG. 17(c)).

Specifically, in the manufacturing method according to the first modified example, in the state where the upper ends of the jetting ports 421 and 422 coincide in level with the lower surface of the lid part 32, the helium gas H is jetted in the right-left direction.

In the case of using a member, such as the lid part 32 in the present embodiment, in which the portion thereof where the pouring hole 33 is formed protrudes downward, the lower surface of the lid part 32 in the portion where the pouring hole 33 is formed (protruding portion) and the upper ends of the jetting ports 421 and 422 are arranged at the same level.

Thus, in the manufacturing method according to the first modified example, the helium gas H is jetted into the exterior 30 at a level close to that of the lower surface of the lid part 32.

Figure 18:
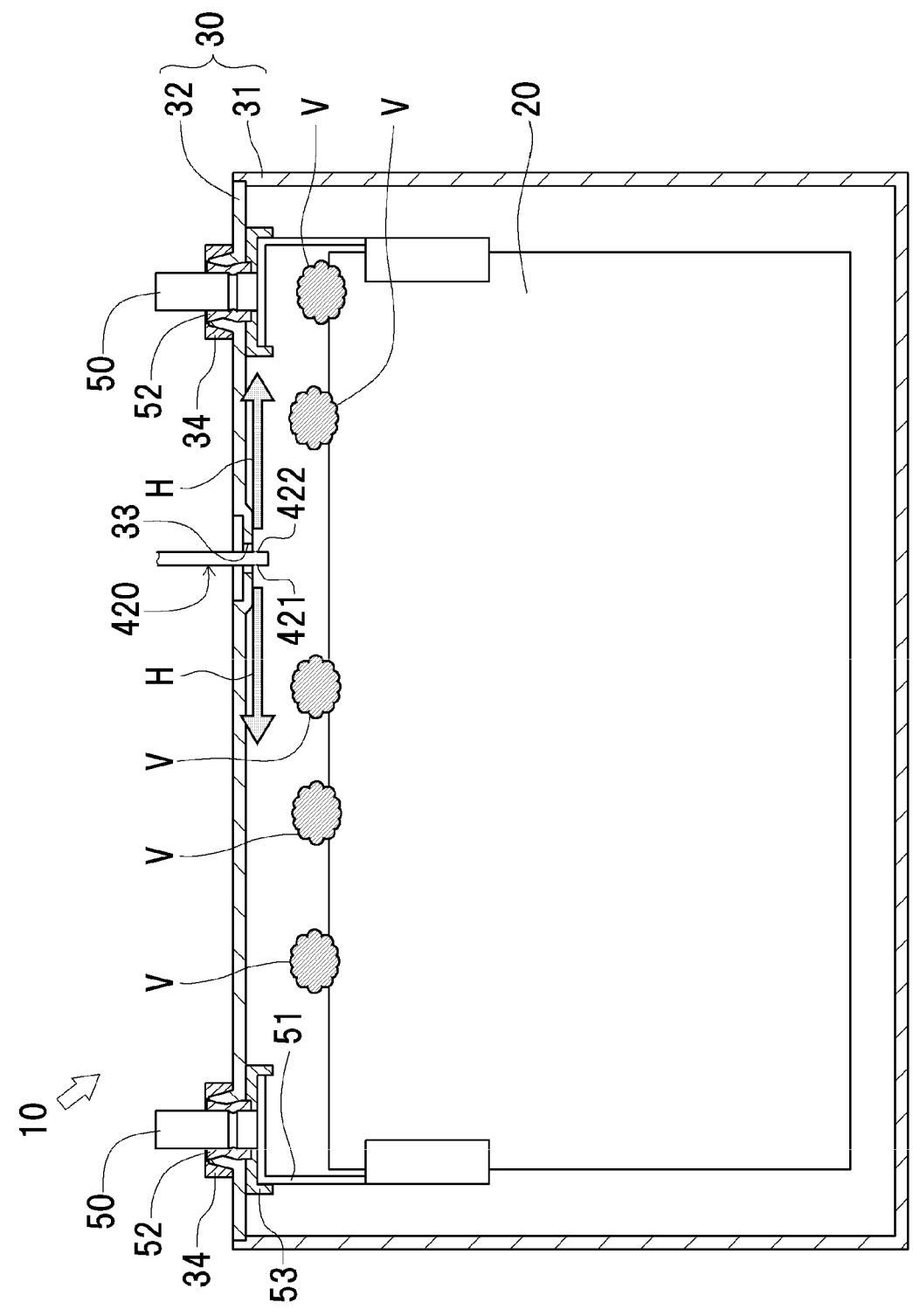
FIG. 18 shows a relationship between levels of the helium gas according the first modified example and a volatilized component of electrolyte solution.

At this time, as shown in FIG. 18, the helium gas H flows in the right-left direction along the lid part 32.

The upward diffusion of the helium gas H jetted in the first modified example is restricted by the lid part 32. In other words, the helium gas H jetted at a position distant from the pouring hole 33 diffuses upward and downward as shown in FIG. 15, whereas the helium gas H in the first modified example diffuses only downward.

Thus, the manufacturing method according to the first modified example makes it possible to narrow an area where the jetted helium gas H diffuses upward and downward, and consequently allows more helium gas H to reach a deep place of the exterior 30. Therefore, the manufacturing method makes it possible to improve directivity of the helium gas H.

Most of the gas with large specific gravity, such as the hydrocarbon gas as a volatilized component of the electrolyte solution E, of the gaseous body inside the exterior 30 sinks in the exterior 30, and exists in a place distant from the lid part 32.

In other words, a plurality of volatilized components V of the electrolyte solution E exist, for example, on the upper portion of the electrode body (power-generation element 20 to be impregnated into the electrolyte solution E).

Accordingly, in the manufacturing method according to the first modified example, the helium gas H is jetted at a level close to that of the lower surface of the lid part 32, and thereby the helium gas H flows so as to avoid the volatilized components V of the electrolyte solution E with large specific gravity, and the like (see arrows H in FIG. 18).

In this manner, the manufacturing method makes it possible to suppress the collision between the helium gas H and the volatilized components V of the electrolyte solution E, and consequently to suppress the generation of the turbulent flow inside the exterior 30.

As mentioned above, the manufacturing method according to the first modified example makes it possible to reduce the leakage of the helium gas during and after introducing the helium gas H by jetting the helium gas H at a level which is lower than that of the lower surface of the lid part 32, and which is close to that of the lower surface of the lid part 32 to such an extent that the jetted helium gas H does not collide against the side surface of the pouring hole 33.

Therefore, the manufacturing method according to the first modified example makes it possible to reduce the variation of the density of the helium gas inside the exterior 30 in the leak testing step.

Then, described is the manufacturing method according to a second modified example differing from the manufacturing method according to the first modified example in the condition under which the helium gas H is jetted.

Figure 19A:
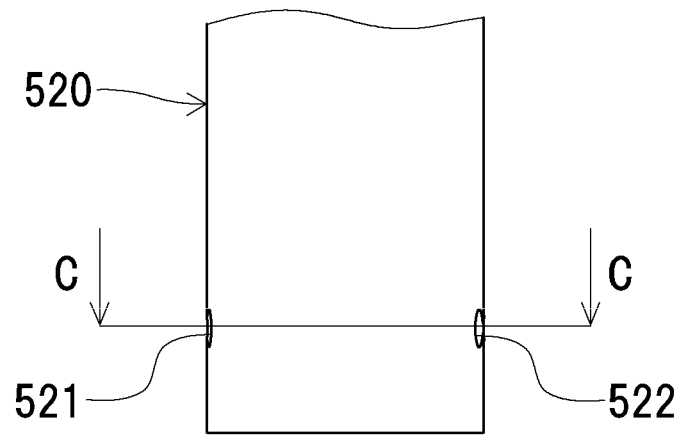
FIG. 19A is an enlarged side view of a tip.
Figure 19B:
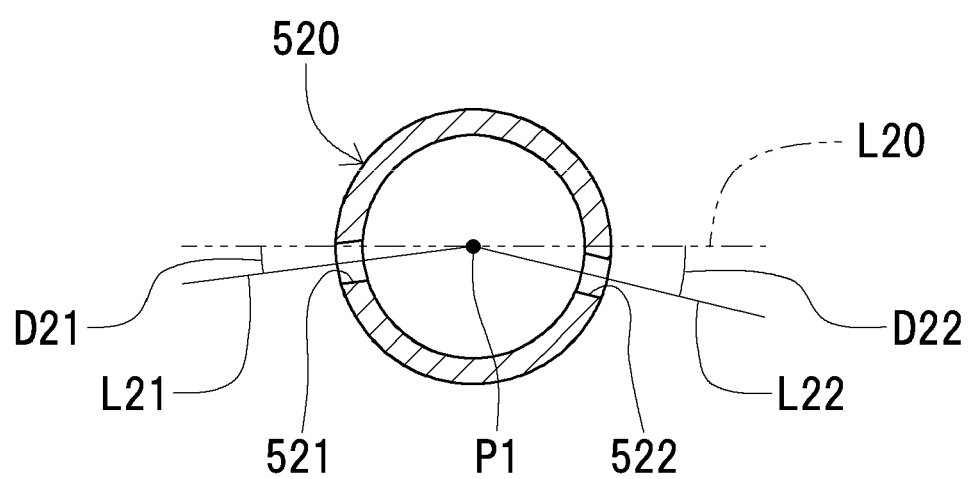
FIG. 19B is a sectional view taken along line C-C in FIG.

As shown in FIG. 19, in the manufacturing method according to the second modified example, the helium gas H is jetted using a nozzle 520 instead of the nozzle 420 in the first modified example.

The nozzle 520 in the second modified example differs from the nozzle 420 in the first modified example in having jetting ports 521 and 522 formed at different intervals around an axis P1 of the nozzle 520.

The axis of the jetting port 521 on the left side is situated at a predetermined distance, in one direction of the circumferential direction of the nozzle 520, from a straight line L20 parallel to the right-left direction, which passes through the axis P1 of the nozzle 520.

The axis of the jetting port 522 on the right side is situated at a distance longer than the distance between the straight line L20 and the axis of the jetting port 521 on the left side from the straight line L20 in the other direction of the circumferential direction of the nozzle 520.

In other words, the straight lines L21 and L22 extending from the axis P1 of the nozzle 520 to the axes of the jetting ports 521 and 522 are at angles D21 and D22 different from each other with the straight line L20, respectively.

Figure 20A:
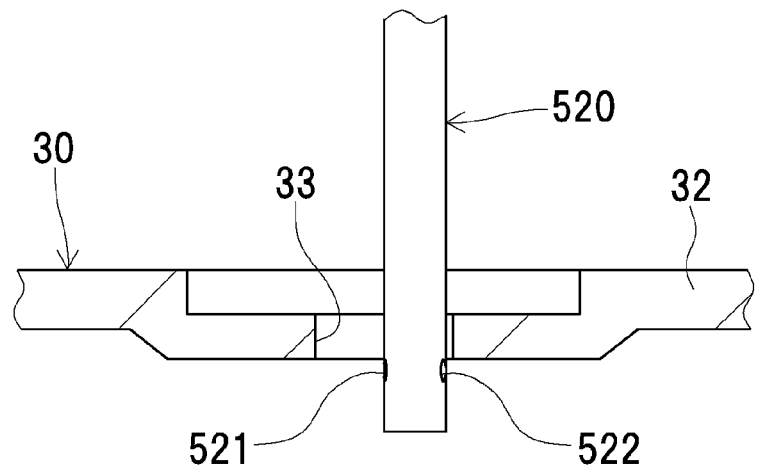
FIG. 20A is a side view.
Figure 20B:
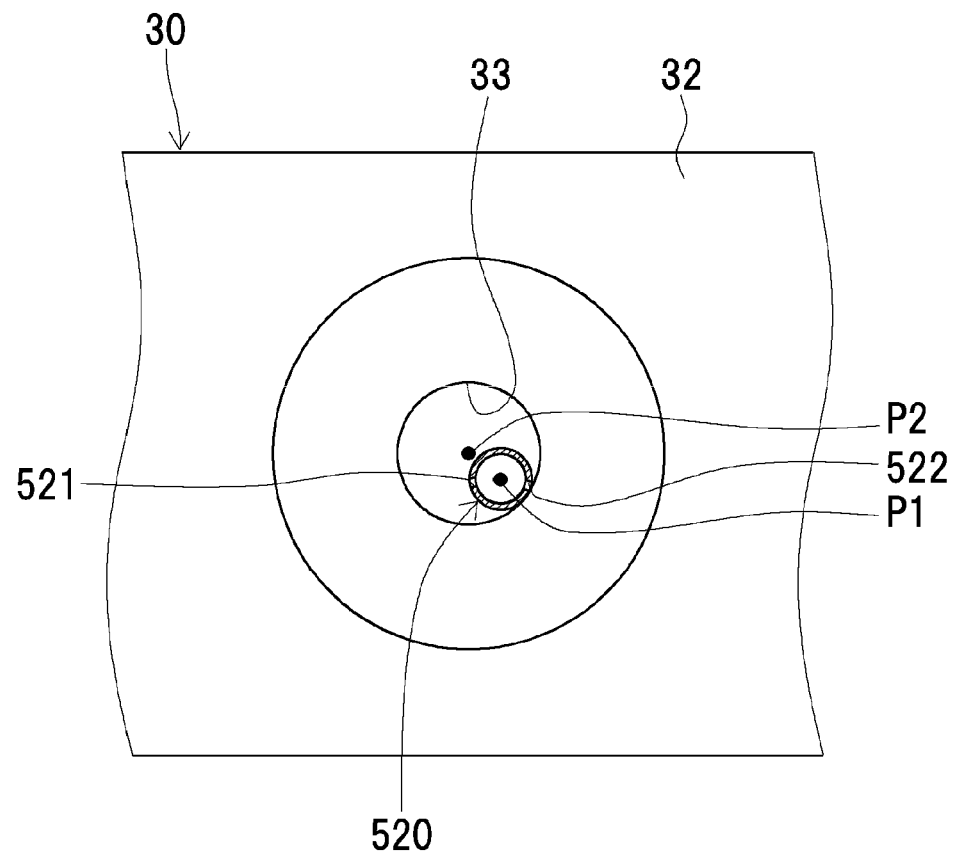
FIG. 20B is a plan view.

As shown in FIG. 20, in the manufacturing method according to the second modified example, the nozzle 520 is downward moved to the same level as the manufacturing method according to the first modified example.

At this time, in the manufacturing method according to the second modified example, in the state where the axis P1 of the nozzle 520 does not coincide in position with an axis P2 of the pouring hole 33, the nozzle 520 is downward moved.

As a result, the jetting port 521 on the left side faces one of the left corners of the exterior 30 formed in substantially a rectangle, in plan view, whose longitudinal direction corresponds to the right-left direction. In other words, as shown in FIGS. 20 and 21(a), the jetting port 521 on the left side faces one (lower vertex in FIG. 21(a)) of the left vertexes of the two vertexes on each of the right and left sides of the exterior 30 in plan view.

The jetting port 522 on the right side faces one of the right corners (lower right vertex of the exterior 30 in FIG. 21(a)).

In the manufacturing method according to the second modified example, the helium gas H is jetted from the nozzle 520 in this state.

In other words, in the manufacturing method according to the second modified example, the helium gas H is jetted toward the two corners on the right and left sides of the exterior 30 (see arrows H in FIG. 21(a)).

In this case, one of the left corners of the exterior 30 corresponds to the farthest side of the exterior 30. Moreover, one of the left corners of the exterior 30 corresponds to the opposite side of the farthest side of the exterior 30.

As shown in FIG. 21(b), aerial currents K generated by the jet of the helium gas H flow through the jetting ports 521 and 522 of the nozzle 520, one corner on the right and left sides of the exterior 30, the other corner on the right and left sides, and the pouring hole 33 in this order.

In other words, the manufacturing method according to the second modified example makes it possible to generate the aerial currents K flowing through the corners of the exterior 30 by defining one each of the corners on the right and left sides of the exterior 30 formed in substantially a rectangle, in plan view, whose longitudinal direction corresponds to the right-left direction as each of the farthest side of the exterior 30 and the opposite side of the farthest side of the exterior 30 when the helium gas H is jetted.

Thus, the manufacturing method according to the second modified example makes it possible to further suppress the generation of the turbulent flow inside the exterior 30, compared with the case of jetting the helium gas H in the right-left direction.

Therefore, the manufacturing method makes it possible to further reduce the leakage of the helium gas during and after introducing the helium gas H, and consequently to further reduce the variation of the density of the helium gas inside the exterior 30 in the leak testing step.

As mentioned previously, in the manufacturing method according to the second modified example, the axis P1 of the nozzle 520 does not coincide in position with the axis P2 of the pouring hole 33.

Figure 22A:
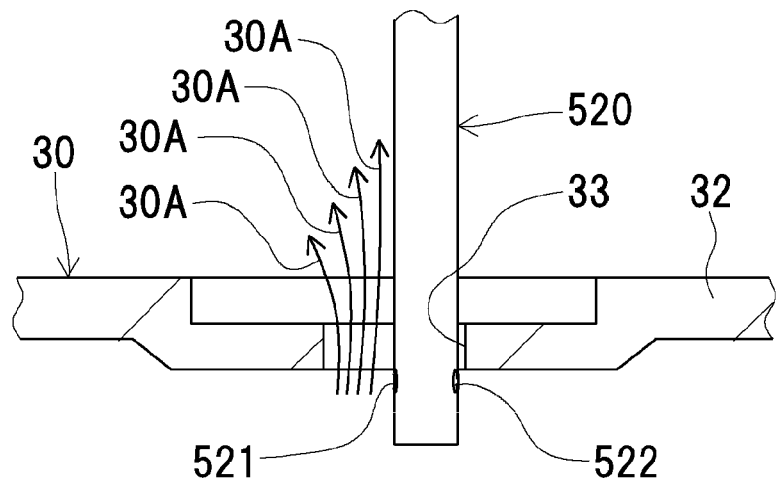
FIG. 22A is a side view.
Figure 22B:
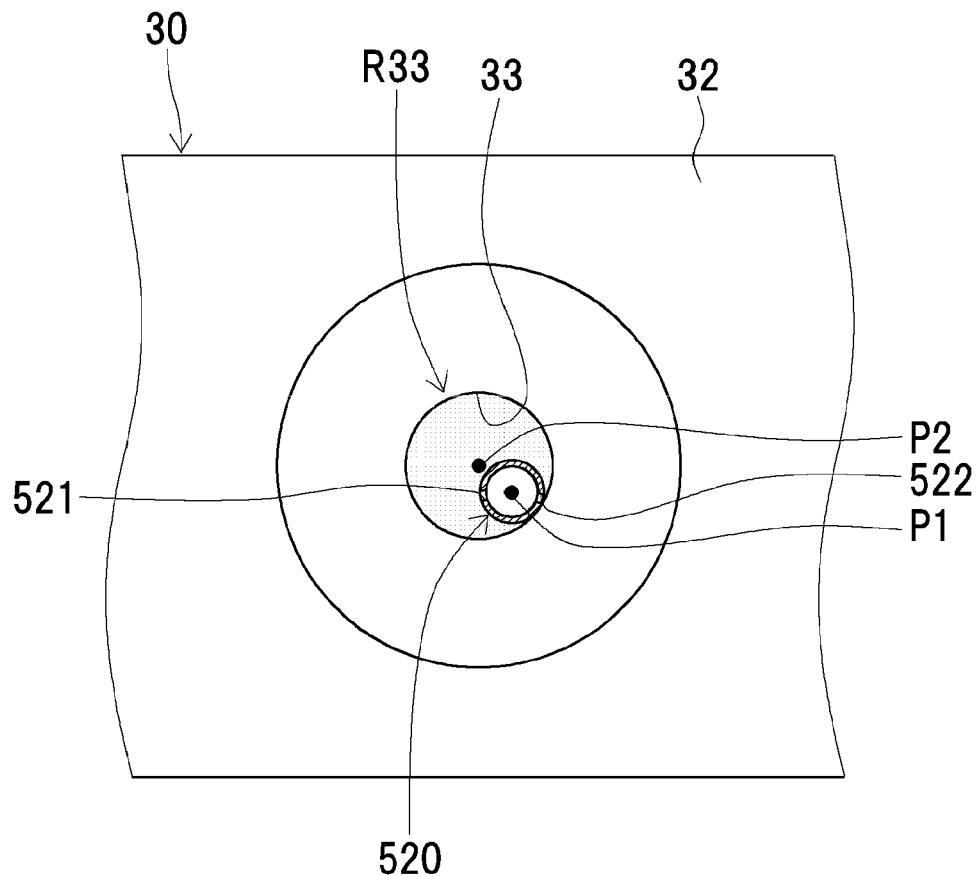
FIG. 22B is a plan view.
Figure 23:
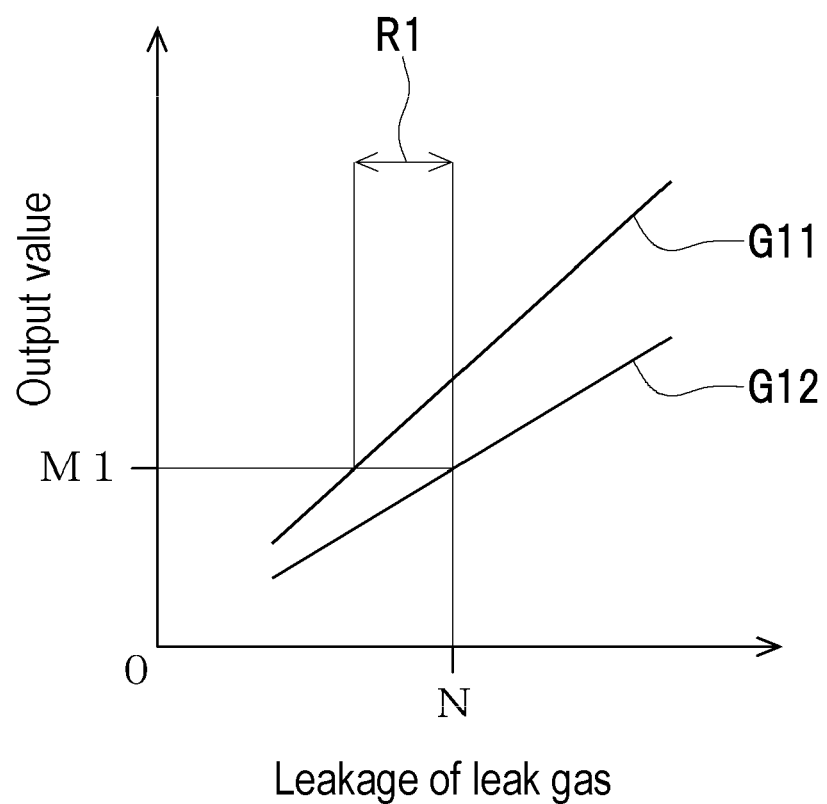
FIG. 23 shows a range within which erroneous determination occurs in conventional technique.

Therefore, as shown in FIG. 22, in the second modified example, the part of the pouring hole 33 into which the nozzle 520 is not inserted is widely open during the jet of the helium gas (see opening part R33 in FIG. 22(b)).

In this manner, the manufacturing method according to the second modified example makes it possible to secure a path through which the gaseous body inside the exterior 30 is discharged.

Therefore, the manufacturing method according to the second modified example makes it possible to restrain the nozzle 520 from blocking the discharge of the gaseous body inside the exterior 30. In other words, the manufacturing method makes it possible to actively discharge the gaseous body inside the exterior 30 through the widely opening part R33 of the pouring hole 33 (see arrows 30A in FIG. 22(a)).

The manufacturing method makes it possible to make the aerial currents K flowing through the corners of the exterior 30 easier to flow, and consequently to further suppress the generation of the turbulent flow inside the exterior 30.

As mentioned above, the manufacturing method according to the second modified example makes it possible to reduce the leakage of the helium gas during and after introducing the helium gas H by jetting the helium gas H at a position different from that of the axis P2 of the pouring hole 33.

Therefore, the manufacturing method according to the first modified example makes it possible to reduce the variation of the density of the helium gas inside the exterior 30 in the leak testing step.

In the second modified example, the helium gas H is jetted toward one each of the corners on the right and left sides of the exterior 30, namely, toward the lower corners on the right and left sides in FIG. 21, but a manner of jetting the helium gas H is not limited thereto.

For example, in the manufacturing method, the helium gas may be jetted toward the other corners (upper corners) on the right and left sides of the exterior. Moreover, the helium gas may be jetted toward one corner on the left side of the exterior and the other corner on the right side of the exterior. Furthermore, the helium gas may be jetted toward the other corner on the left side of the exterior and one corner on the right side of the exterior.

In the second modified example, the nozzle 520 is downward moved in the state where the axis P1 of the nozzle 520 does not coincide in position with the axis P2 of the pouring hole 33, but a manner of moving the nozzle 520 is not limited thereto. For example, in the manufacturing method, the nozzle is downward moved, and then is moved so that the axis of the nozzle does not coincide in position with the axis of the pouring hole.

Even in the case of introducing the helium gas by the manufacturing methods according to the fourth embodiment, the fifth embodiment, the first modified example, and the second modified example, the sealing step is preferably performed immediately after introducing the helium gas.

In this manner, the manufacturing method makes it possible to minimize the variation of the leakage of the helium gas, and to improve the rate of the utilization of the helium gas, and the rate of the erroneous determination.

In the manufacturing methods according to the fifth embodiment, the first modified example, and the second modified example, the helium gas is jetted, but the mixed gas in the first embodiment, or the mixed gas in the fourth embodiment may be jetted.

In the manufacturing methods according to the fifth embodiment, the first modified example, and the second modified example, in order to increase the apparent specific gravity of the helium gas, for example, the helium gas may be cooled, or the exterior may be heated when the helium gas is jetted.

In other words, in the manufacturing methods according to the fifth embodiment, the first modified example, and the second modified example, the helium gas (or the mixed gas) may be jetted after performing the processing step for increasing the apparent specific gravity of the helium gas.

INDUSTRIAL APPLICABILITY

The present invention may be applied to a method for manufacturing a sealed battery, including a leak testing step for detecting leak of detection gas introduced into a battery case.

REFERENCE SIGNS LIST

10: battery (sealed battery)
30: exterior (battery case)
H: helium gas (detection gas)

The invention claimed is:

1. A method for manufacturing a sealed battery having a battery case, comprising:
    a leak testing step for detecting leak of detection gas introduced into the battery case;
    a processing step for increasing apparent specific gravity of the detection gas;
    an introducing step for introducing the detection gas into the battery case after increasing the apparent specific gravity of the detection gas; and
    a sealing step for sealing the battery case into which the detection gas is introduced.

2. The method according to claim 1, wherein
    in the processing step, mixed gas is prepared by mixing the detection gas and gas with specific gravity larger than that of the detection gas, and
    in the introducing step, the prepared mixed gas is introduced.

3. The method according to claim 1, wherein
    in the processing step, at least one of a temperature inside the battery case and a temperature of the detection gas is adjusted so that the temperature of the detection gas is lower than the temperature inside the battery case.

4. The method according to claim 2, wherein
    an average of specific gravity of the mixed gas is larger than an average of specific gravity of a gaseous body inside the battery case.

5. A method for manufacturing a sealed battery having a battery case, comprising:
    a leak testing step for detecting leak of detection gas introduced into the battery case;
    an introducing step for introducing the detection gas into the battery case; and
    a sealing step for sealing the battery case into which the detection gas is introduced, wherein
    in the introducing step, a jetting port of a nozzle capable of jetting the detection gas is arranged inside the battery case, and the detection gas is jetted from the jetting port facing the farthest side of the battery case.

6. The method according to claim 5, wherein
    in the introducing step, along a direction parallel to one face, having an opening through which the jetting port of the nozzle is arranged inside the battery case, of the battery case, the detection gas is jetted toward the farthest side of the battery case, and the opposite side of the farthest side of the battery case.

7. The method according to claim 1, wherein
    the sealing step is performed immediately after the introducing step.

* * * * *